Figure 1A:
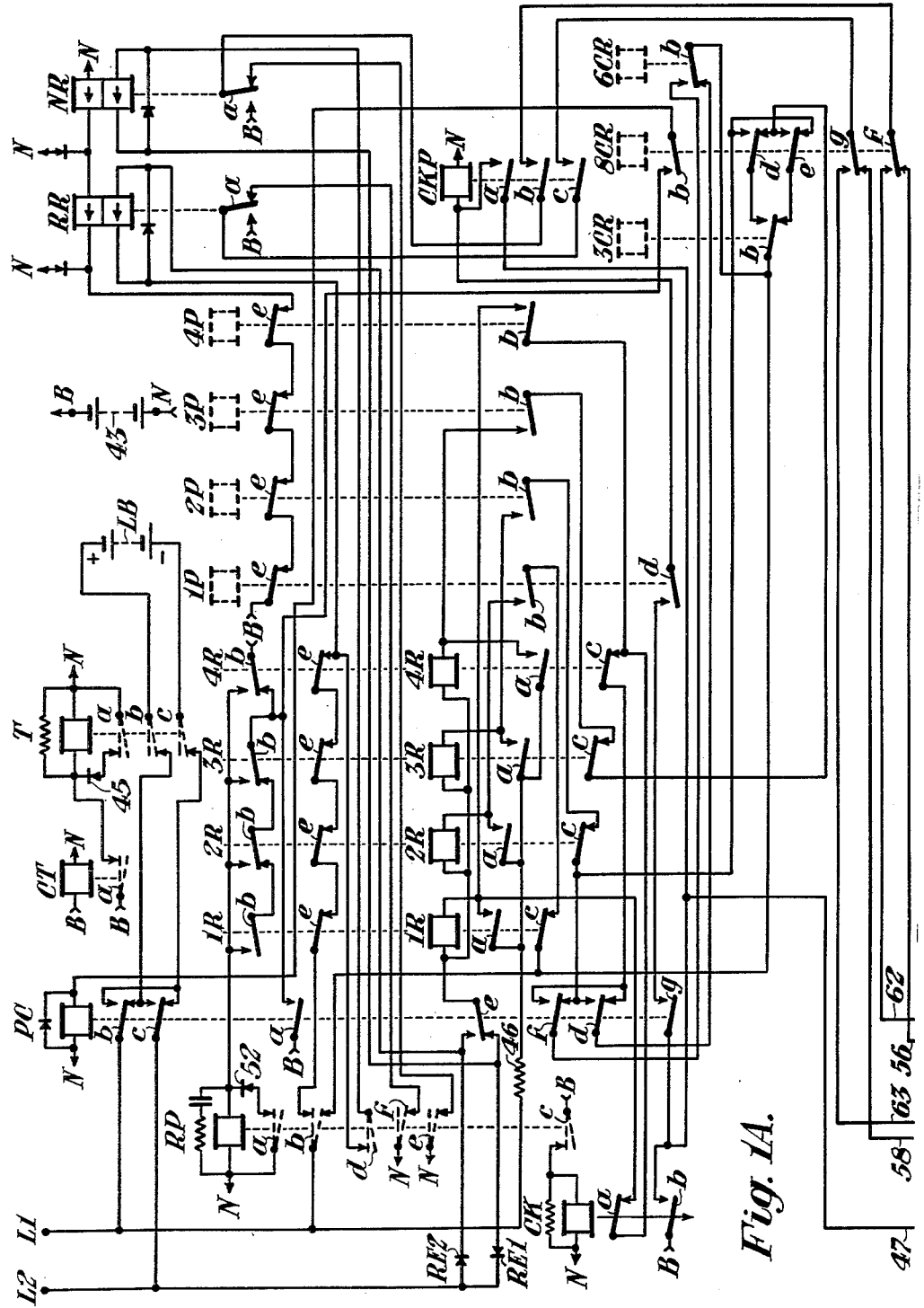

INVENTOR.
Crawford E. Staples.
BY W. L. Stout
HIS ATTORNEY

May 31, 1960
C. E. STAPLES
2,939,111
REMOTE INDICATION SYSTEMS
Filed July 5, 1957
8 Sheets-Sheet 3
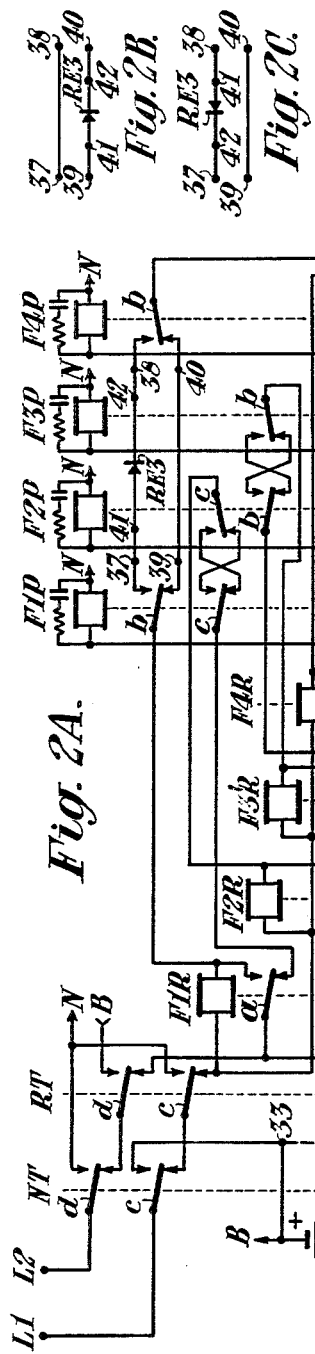
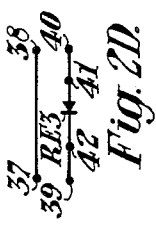
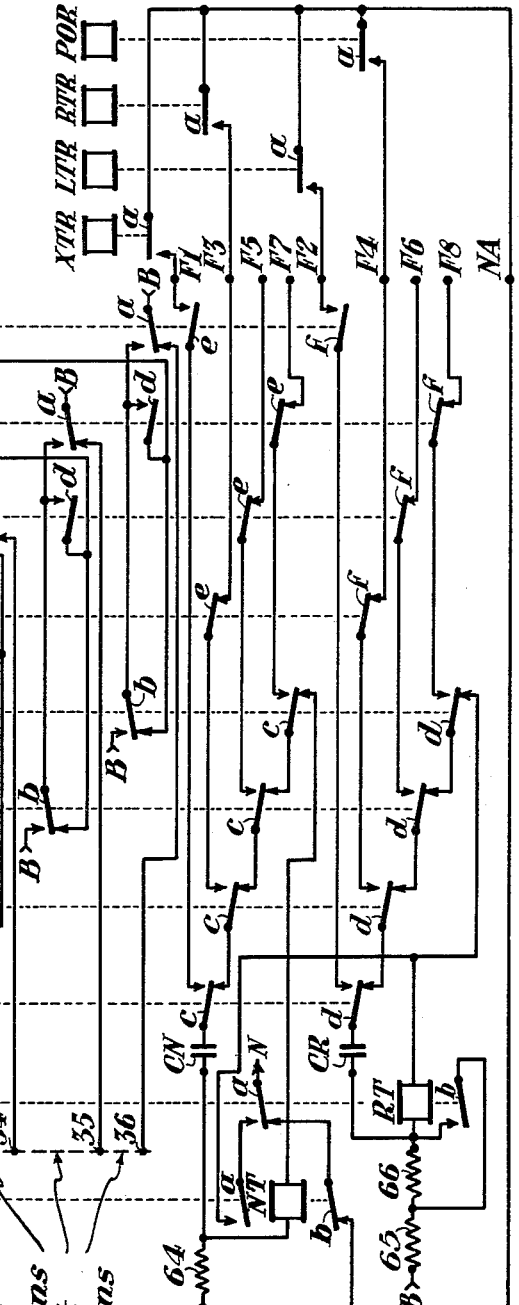
INVENTOR.
Crawford E. Staples
BY W. L. Stout
HIS ATTORNEY

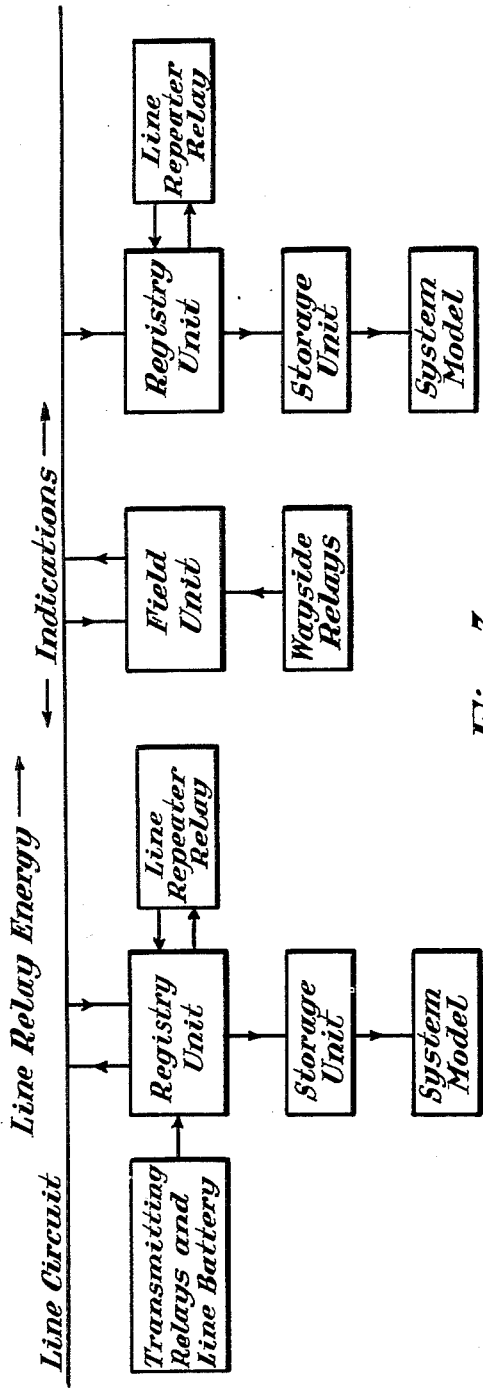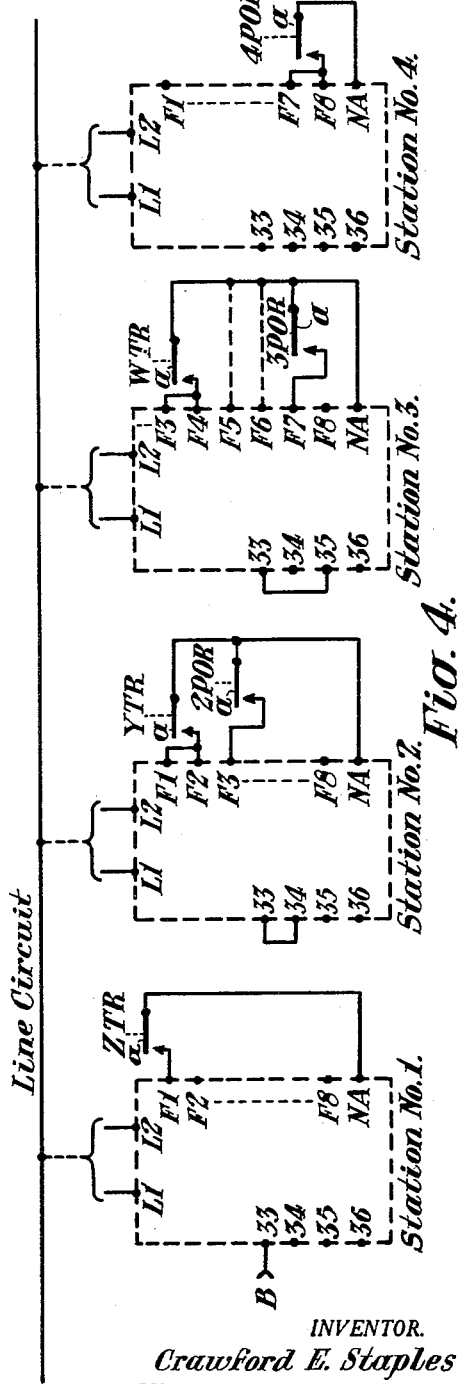

May 31, 1960  C. E. STAPLES  2,939,111
REMOTE INDICATION SYSTEMS
Filed July 5, 1957  8 Sheets-Sheet 5

United States Patent Office 2,939,111
Patented May 31, 1960

2,939,111

REMOTE INDICATION SYSTEMS

Crawford E. Staples, Homewood, Pa., assignor to Westinghouse Air Brake Company, Wilmerding, Pa., a corporation of Pennsylvania Filed July 5, 1957, Ser. No. 670,130

11 Claims. (Cl. 340—163)

My invention relates to a remote indication system. More particularly, my invention relates to an indication system for transmitting a plurality of two position indications from several remote stations to a central control office over a single communication channel.

Most of the present, well known remote control systems also provide for the transmission of indications from the remote stations and for the recording and display of such indications at the central control office. Such indications are generally returned to the office after the transmission of each control code or control function. Many of the systems also provide for the automatic transmission of such indications from a station at the time that a change occurs in any of the indicating functions. Such systems generally transmit from one station or remote location at a time, with some form of station identification being included in the indication code. In such systems, those stations which are not transmitting are locked out to prevent interference between indication codes transmitted from more than one station at one time. However, some remote control systems scan the stations sequentially at any time that a code is initiated. This may occur during a control code or upon initiation of an indication from any one of the stations. Such systems are generally controlled by the office equipment as to code progression. That is, the drive or control of the code as it proceeds from one step or position to another is a function of the office apparatus.

In certain railway signal installations, there is a need for continuous, nearly instantaneous indications as to track occupancy and certain related functions. These indications are in addition to those which may possibly be provided by a regular remote control system by which the spaced interlockings are controlled by a central operator. As an example, the additional indications may comprise track occupancy indications in the vicinity of intermediate signals between controlled interlocking points. It is also frequently desirable to provide power-off indications from these remote signals or other points where commercial power is supplied. Still other necessary indications are those giving information as to accidental or incorrect grounds or crosses between signal control wires.

In such indication systems, it is also advantageous under certain situations to have a second location at which the indications may be recorded. This secondary registry location is separated from the central control office, but is occupied by some supervising dispatcher or operator to whom the information is important. Such indication systems if furnished must operate continuously and must be of small size and economical in operation. In addition, they should be adaptable to the transmission of a different number of indications from each location. That is, there must be no waste of the total capacity of the system. As in any signal installation, a relatively long life of the apparatus is a very desirable feature.

Accordingly, it is an object of my invention to provide a remote indication system which will furnish continuous indications at a central office from several remote stations.

It is also an object of my invention to provide such a remote indication system to furnish continuous indications, from several remote locations, at a central office and at one or more selected secondary registry points.

A further object of my invention is to provide an indication system which will furnish continuous indications at the central office to record changes in the various indicating functions nearly instantaneously with those changes.

Another object of my invention is to provide an indication system whose capacity may be divided among several stations without loss of any of the available total capacity.

Still another object of my invention is to provide an indication system for continuous operation with a relatively long life of the component parts.

A further object of my invention is to provide such an indication system for continuous operation in which the operations of individual relays are reduced to a minimum level to provide relatively long life of these component parts.

A still further object of my invention is to provide a remote indication system, to furnish indications in a central office from several remote stations, in which the capacity may be divided among these stations as required without reduction of the total capacity.

It is also an object of my invention to provide a continuously operating remote indication system by which information may be transmitted from several remote locations to two or more recording points with the indications being recorded at each recording point simultaneously.

Other objects and features of my invention will become apparent from the following specifications when taken in connection with the accompanying drawings and appended claims.

In practicing my invention, I provide a registry unit at the control office and at each of the other indication recording locations in the system. In addition, code following apparatus is provided at each station location. All of these units are connected by a single communication channel which, for example, may be a two-wire line circuit. At the master control office, there is also a continuously operating code transmitting relay arrangement which supplies coded energy to the communication channel from an office source which, in the specific example of a two-wire line circuit, is an office line battery. The code transmitter, by its periodic operation, provides a stepped code, each step having an energy-on and an energy-off period. The coded energy, that is, the on-off code, is used to drive the registry units and the station code units. Each such unit has a group of line relays and a relay counting chain with certain of the relays serving in both functions, that is, both as line relays and as counting chain relays. All of the registry units are continuously stepped forward during each of the energy-on periods in the line circuit. When the limit of operation of the registry unit is reached, the unit immediately initiates another cycle of operation. While the transmitting action of the office code apparatus is continuous and each code step is identical, this cyclic operation of the registry units divides the code into cycles of predetermined length. The stations are divided into four different operating groups with the code units in each group of stations stepping to follow the office code only during particular portions of the code as predetermined by variable selective line connections. In the specific showing herein, the energy periods during the first half of each code cycle have a relative positive polarity and during the second half, the opposite or relative negative line polarity, as controlled by the office location.

Indications from a particular station are transmitted during the deenergized or off period of the code step to which the indications are assigned. During these off periods, the station battery supplies energy for transmitting the indications to the office, each step being capable of carrying two such indications by using the positive and negative relative polarities. At the office and other registry locations, the line relays are disconnected from the circuit during the deenergized portion of the code step. In their place, indication receiving relays are connected to operate according to the polarities of the indication pulses received. The position of the receiving relays and the stepped position of the registry unit establish indication recording circuits for registering the incoming indications in a storage unit. From this storage unit, a visual display of the receiving indications may be accomplished in any desired manner.

Figure 1B:
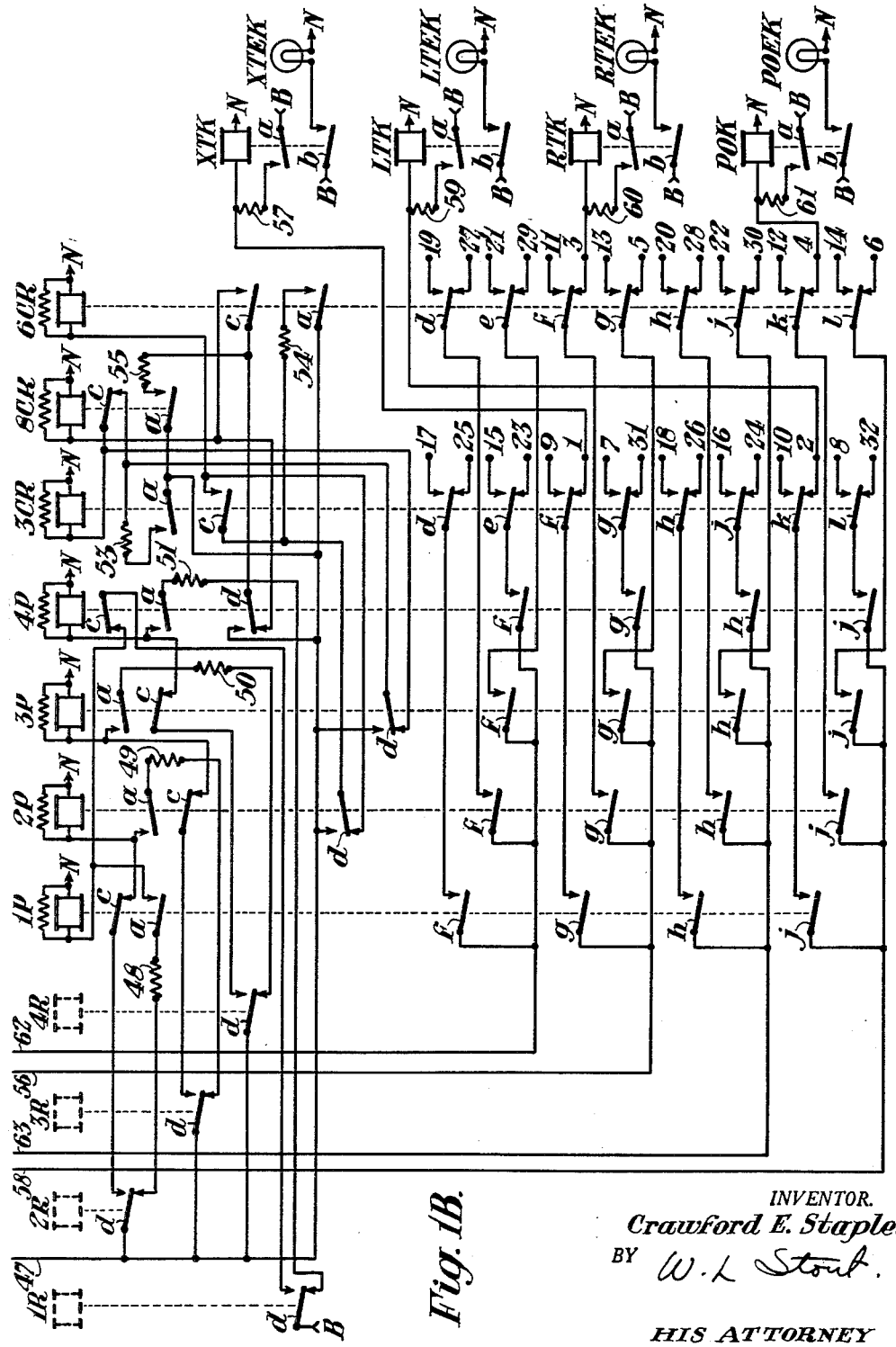

Referring now to the drawings, Figs. 1A and 1B, when placed adjacent vertically with Fig. 1A at the top, so that the numerically referenced connections coincide between the two figures, show diagrammatically one form of apparatus at the control office location embodying my invention. By eliminating the code transmitting means shown in Fig. 1A, these two figures also represent the apparatus at a secondary indication recording location in the system of my invention.

Fig. 2A shows diagrammatically one form of apparatus at a station location embodying my invention and which cooperates with the apparatus shown in Figs. 1A and 1B. Figs. 2B, 2C, and 2D show other patterns of the variable connections in the station apparatus by which the arrangement shown in Fig. 2A may be selectively transformed to represent the apparatus at stations in the other selective groups of stations.

Fig. 3 of the drawings is a schematic showing in conventional manner of the connections and apparatus which are necessary to establish an indication system of my invention.

The schematic showing of Fig. 4 represents the variable external connections at several station locations of one selective group which permit split indications in order that none of the capacity of the system will be wasted.

Figure 5A:
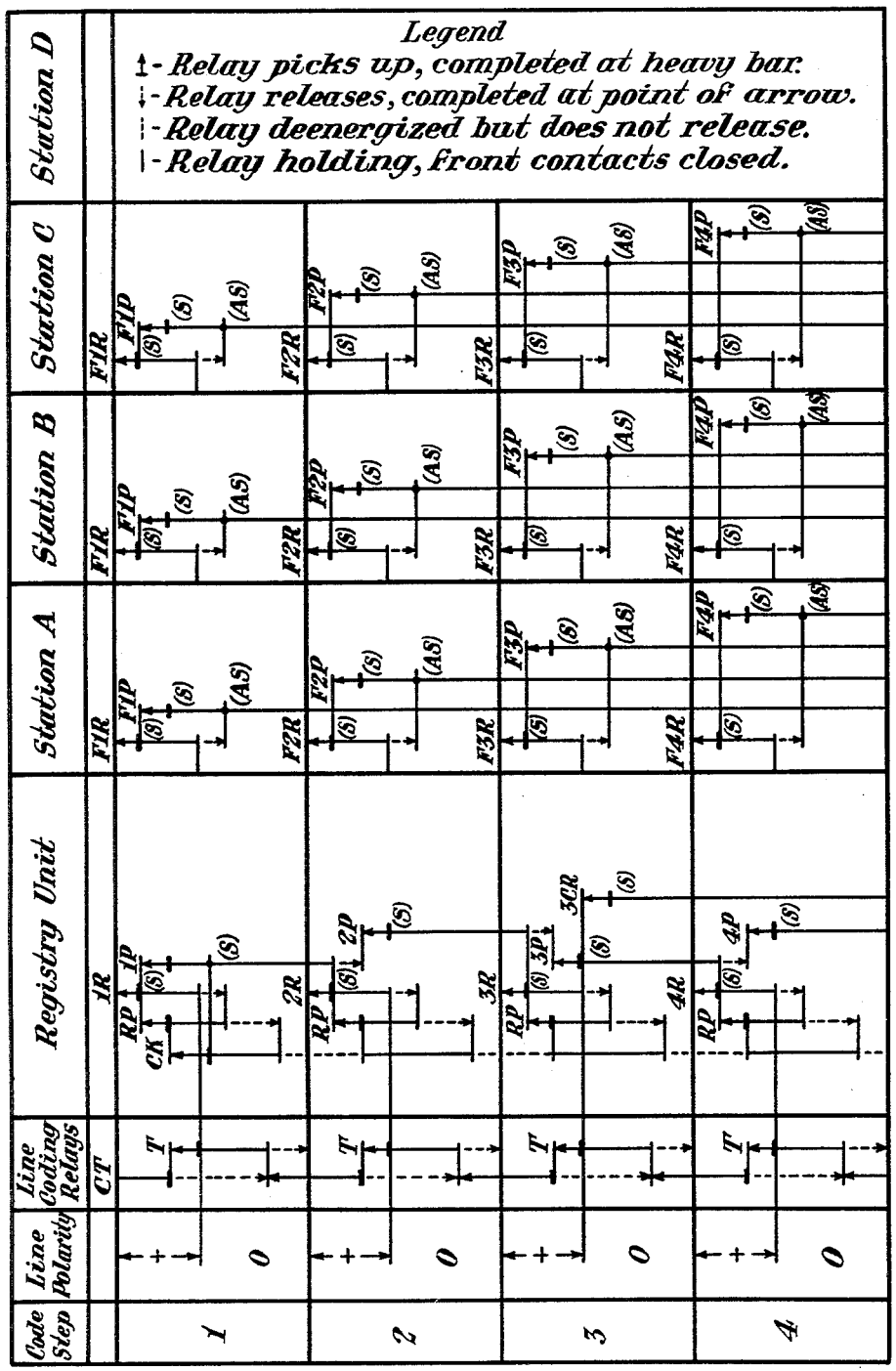

The chart of Figs. 5A, 5B, 5C, and 5D, which are to be arranged vertically in that order with Fig. 5A at the top, is a representation, using conventional symbols and form, of the major relay operation at the office and each of the four station groups during the first code cycle of operation. With only slight modifications and additions, the chart may also be used to outline relay operations during normal continuous operation.

In all of the figures of the drawings, similar parts of the apparatus are designated by similar reference characters.

Each location, that is, the office secondary recording points, and stations, is provided with a suitable local source of direct current energy for energizing the apparatus. For convenience, this source of energy at each location is shown as a battery of proper size and capacity. For example, in Fig. 1A, this source is shown as local battery 43 having positive and negative terminals B and N, respectively. Likewise, in Fig. 2A, a local battery at the station is designated by the reference character 44. This battery likewise has positive and negative terminals designated by the similar characters B and N, respectively.

To further simplify the drawings, other conventional symbols, here defined, have been used. Certain of the relays in the system are provided with slow release characteristics, either inherently in the construction of the relay or by use of snubs across the relay winding. The contacts of such relays are indicated in the usual manner by a downward pointing, vertical arrow through the contacts. Contact armatures of coding or code following relays at the office which operate in a periodic manner are shown dotted in each position, to indicate conventionally that these contacts have no normally occupied position. Also for convenience, in the showing of the office apparatus, contacts of certain relays appear in both figures although the control circuits for the relay windings are shown only on one of the figures. However, to properly identify all contacts, the relay winding is repeated on the other figure of the pair by the usual relay symbol shown in dotted lines. It is to be understood that all contacts of any relay in which are so divided between Figs. 1A and 1B operate in the same manner at the same time.

I shall now describe in a general manner the apparatus at the various locations in the system of my invention and shall thereafter describe in detail the operation of the system. The schematic showing in Fig. 3 illustrates conventionally the connections between the various portions of the units of the system and a flow diagram of the indications and line energy. Each unit is shown by a conventional block in the diagram, the control office being located at the extreme left. At the extreme right of Fig. 3 is a secondary indication recording or registry location. Each of these two locations is provided with a similar registry unit. Likewise, each has a storage unit for the received indications and a system model. If the indication system of my invention is used in connection with a railway signaling system, the system model will consist of a well known track model which shows in miniature fashion an outline of the track system having mounted thereon certain lamps to indicate track occupancy, switch positions, or other information. It is noted that each of the recording locations is provided with a line repeater relay. However, only the office or master control location has a transmitting relay arrangement with a line battery. In Fig. 3, the communication channel is designated as being a line circuit. It is to be understood that, in some forms of the system of my invention, this channel may be other than a two-wire line circuit. For example, it may be a carrier channel or a microwave channel.

At the center of Fig. 3, there is represented a single station location with a field or station code unit which includes the indication transmitting apparatus. The second block diagram at the station location represents the wayside relays, which originate the indications to be transmitted. Again, if the system is used in connection with a railway signaling system, the wayside relays would be the usual track, ground detection, or power-off relays. It is to be understood that other field stations are generally provided in the system, the total being limited only by the total capacity of the single system. In one particular form of my invention, each complete system has a maximum capacity of 32 indications with each station in the system having an individual capacity of between 1 and 8 indications per station as shown in Fig. 3.

Indications are transmitted from the station, that is, from the field unit to the line circuit and flow in each direction along the line circuit to the control office at the left and to the secondary recording point at the right, entering the registry unit at each location. Line relay energy is indicated as flowing from the control office out of the registry unit to the field stations and to the secondary recording location. To provide a point of continuity between the discussion of Fig. 3 and the discussions of the more detailed circuit arrangements of Figs. 1A, 1B, and 2A, the line circuit connections are indicated in these latter drawings by the terminals L1 and L2, it being assumed for the purposes of this description that the communication channel is a two-wire line circuit as previously described.

Referring now to the apparatus shown in Figs. 1A and 1B, it will be seen that the office location is provided with a code transmitting relay arrangement comprising the code transmitter CT and its repeater, transmitting relay T (Fig. 1A). Each registry unit includes a line and counting relay chain comprising the line relays 1R to 4R (Fig. 1A) and line stick repeater relays 1P to 4P (Fig. 1B). Operation of any line relay at the office and each secondary recording point is further repeated by the line repeater relay RP. In addition, there is a group of chain repeat relays including relays 3CR, 6CR, 8CR (Fig. 1B), and pole changing relay PC (Fig. 1A). Coding action is checked by code check relay CK and its repeater relay CKP (Fig. 1A). Finally, the registry unit includes the normal indication receiving relay NR and the reverse indication receiving relay RR (Fig. 1A). The control circuits for these relays and for the indication registry or recording relays K (at right, Fig. 1B) will now be more fully described.

As shown in the present application, code transmitter CT is of the relay type well known in the railway signal art. For example, transmitter CT may be of the type shown in Letters Patent of the United States 2,285,890, granted June 9, 1942, to Herman G. Blosser for a Stationary Contact. A similar transmitter is also shown in Letters Patent of the United States 2,645,729, granted July 14, 1953, to Herman F. Franke for Pendulum Construction. However, the system of my invention is not restricted to the relay type of code transmitter but any type of code transmitter which periodically opens and closes its contacts may be used. Transmitter CT is continuously energized as is obvious from an inspection of the drawings where it may be noted that the relay winding is connected between terminals B and N of the local source. While not absolutely necessary for an understanding of my invention, and not limiting the system to such a code rate, it may be assumed that contact $a$ of transmitter CT opens and closes at the rate of 240 times per minute, that is, it operates at a 240 code rate.

Transmitting relay T repeats the operation of transmitter CT, the winding of relay T being connected in series with contact $a$ of transmitter CT across terminals B and N of the local source. Thus, relay T is obviously energized and deenergized at the code rate at which transmitter CT is operating, here assumed as the 240 code rate. In order to retard the release of relay T upon deenergization and at the same time not affect its pick up upon reenergization, a half-wave rectifier 45 is connected across the relay winding in series with front contact $a$ of the relay so that it tends to slightly retard the release of relay T in a manner that is well known in the art.

The line circuit herein used as the communication channel, represented in Fig. 1A by terminals L1 and L2 in the upper left hand portion, is interrupted at back contacts $b$ and $c$ of relay T each time this relay is energized and picks up. When the relay releases to reclose these contacts, energy is supplied to the line circuit from a line battery LB, the circuit being traced from the positive terminal of battery LB over back contact $b$ of relay T, back contact $b$ of pole changing relay PC to terminal L1 and returning from terminal L2 over back contact $c$ of relay PC and back contact $c$ of relay T to the negative terminal of battery LB. Line battery LB is separate from the local source of energy here represented by battery 43. It is to be understood that the source of energy for the line circuit, that is, the communication channel, will be in keeping with the type of channel used and/or the desires of the users of the system. In other words, even when a line circuit is used, the source of line energy may be a full-wave rectifier energized from a commercial alternating current source, such arrangements being well known in the art.

Pole changing relay PC is used to reverse the relative polarity of the energy supplied to line circuit L1—L2 at certain times in the code cycle. This relay remains released for the first half of the code cycle and is energized during the second half of the cycle. If it is assumed, for the purpose of a specific showing, that the code cycle comprises 16 steps, relay PC is then energized and picks up on step 8 and releases on step 16. The control circuit for relay PC may be traced from terminal B over back contact $b$ of line relay 4R, front contact $b$ of relay 8CR, and the winding of relay PC to terminal N. When relay PC picks up to close its front contact $a$, a stick circuit is completed including this front contact and front contact $b$ of relay 8CR so that relay PC remains energized until the release of relay 8CR during the final step of the code cycle. Relay PC is thus, in effect, a repeater of chain repeat relay 8CR. Other functions of relay PC, as part of the chain repeat relay group, will be developed hereinafter as the description of the apparatus and operation progresses.

The registry unit is also provided with four line relays 1R, 2R, 3R, and 4R. One of these relays picks up each time that the line is reenergized upon the release of relay T. The R relays operate as combination line, chain relays counting the code steps. In the 16 step system shown in the present application, relay 1R picks up and releases on code steps 1, 5, 9, and 13. Relay 2R picks up and releases on steps 2, 6, 10, and 14, while relay 3R picks up and releases on code steps 3, 7, 11, and 15. This leaves steps 4, 8, 12, and 16 upon which relay 4R picks up and releases. When the line is deenergized, that is, when relay T picks up to interrupt the line circuit, all of the line relays are released.

The initial energizing circuit for relay 1R may be traced from line wire L1 over back contact $b$ of line repeater relay RP, back contact $b$ of relay 6CR, back contact $d$ of relay PC, back contact $c$ of relay 4R, back contact $a$ of checking relay CK, the winding of relay 1R, back contact $e$ of relay PC, and a half-wave rectifier unit RE1 in its forward direction to line L2. Back contact $a$ of relay CK in this circuit is in multiple with front contact $b$ of line stick repeater relay 4P, and as will be shown later, when the code cycle becomes established, back contact $a$ of relay CK will be open and the energizing circuit for 1R will be controlled over front contact $b$ of relay 4P. With line L1 positive during the first half of the code cycle, rectifier RE1 is poled in the proper direction to allow current to flow so that relay 1R will be energized. During the latter half of the code cycle, with relay PC picked up so that its front contact $e$ is closed, the circuit for 1R is transferred to rectifier unit RE2 which is poled in the opposite direction so that relay 1R is again energized since line L2 will be positive during this portion of the code cycle. When relay 1R picks up, it establishes a stick circuit which is traced from line L1 over resistor 46, front contact $a$ and the winding of relay 1R, and thence to line L2 over back or front contact $e$ of relay PC and rectifier unit RE1 or RE2, respectively, depending upon the position in the code cycle.

The energizing circuit for relay 2R may be traced from line L1 over back contact $b$ of relay RP, back contact $c$ of relay 1R, front contact $b$ of relay 1P, the winding of relay 2R, and thence over front or back contact $e$ of relay PC and the corresponding rectifier unit to line L2. The stick circuit for relay 2R traced from line L1 includes resistor 46 and front contact $a$ and the winding of relay 2R, and thence as previously traced over contact $e$ of relay PC. During the early part of a code cycle, an energizing circuit for relay 3R extends from line L1 over the previously mentioned back contact $b$ of relay RP, back contact $b$ of chain repeat relay 3CR, back contact $e$ of relay 8CR, back contact $c$ of relay 2R, front contact $b$ of relay 2P, the winding of relay 3R, and thence over back or front contact $e$ of relay PC to line L2. During another portion of the code, the circuit for relay 3R extends from back contact $b$ of relay RP over front contact $b$ of relay 6CR and back contact $f$ of relay PC to back contact $c$ of relay 2R and thence as previously traced. At other times, back contact $b$ of relay 6CR and front contact $d$ of relay PC complete the circuit path for relay 3R. At still other times, the circuit will include front contact *b* of relay 3CR and front contact *d* of relay 8CR. The stick circuit for relay 3R includes resistor 46, previously mentioned, and front contact *a* and the winding of relay 3R and thence over contact *e* of relay PC in either of its two positions. The circuit for energizing relay 4R includes either front contact *b* of relay 3CR and back contact *d* of relay 8CR or back contact *b* of relay 3CR and front contact *e* of relay 8CR, and then over back contact *c* of relay 3R and front contact *b* of relay 3P to the winding of relay 4R, the rest of the circuit being similar to the other energizing circuits previously traced. The stick circuit for relay 4R, including its own front contact *a*, is similar to the stick circuits already discussed for the other three line relays.

The office location is also provided with four line stick repeater relays 1P, 2P, 3P, and 4P. These relays are controlled by the line relays R, but act as part of the counting chain of the registry unit. Contacts of these relays are found in the delivery circuits to the indication storage unit, these contacts determining or establishing the proper indication recording circuits according to the code step or position in the code cycle that an indication is received. Relay 1P is energized and picks up on code step 1 and drops out after line relay 2R picks up on code step 2. As will appear, the combination of relay 2R up and 1P released establishes a circuit for energizing relay 2P. This procedure is continued in a corresponding manner to code step 4. On the fifth code step, the combination of relay 1R picked up and relay 4P released establishes the energizing circuit for relay 1P and the relays repeat this procedure during the next four code steps and each group of four code steps thereafter.

The circuit for energizing relay 1P on the first code step of the cycle is traced from terminal B at front contact *d* of relay 1R over back contact *c* of relay 4P and the winding of relay 1P to terminal N. A stick circuit for relay 1P includes front contact *b* of checking relay CK which, as will appear hereinafter, holds up during the continuous coding action of the office, wire 47, back contact *d* of relay 2R, resistor 48, and front contact *a* of relay 1P. Relay 1P is held energized, but, due to resistor 48 in this stick circuit, the level of energization of the relay winding is reduced. When the circuit is interrupted by the opening of back contact *d* of relay 2R, relay 1P will thus release somewhat more quickly than if the winding were fully energized.

As previously indicated, when relay 1P releases, the circuit is established for energizing relay 2P. This circuit extends from terminal B over front contact *b* of relay CK, wire 47, front contact *d* of relay 2R, back contact *c* of relay 1P, and the winding of relay 2P to terminal N. Relay 2P picks up and completes a stick circuit similar to the stick circuit for relay 1P, but including back contact *d* of relay 3R, resistor 49, and front contact *a* of relay 2P.

During the following code step, the circuit for energizing relay 3P is completed and includes front contact *b* of relay CK, wire 47, front contact *d* of relay 3R, back contact *c* of relay 2P, and the winding of relay 3P. The stick circuit for this latter relay includes back contact *d* of relay 4R, resistor 50, and front contact *a* of the relay itself. During the fourth and corresponding code steps, relay 4P is energized by a circuit which includes front contact *d* of relay 4R, back contact *c* of relay 3P, and the winding of relay 4P. The stick circuit for this latter relay includes its own front contact *a*, resistor 51, and back contact *d* of relay 1R. It is to be noted that this stick circuit differs slightly from the stick circuits of the other line stick repeater relays in that it does not include contact *b* of relay CK.

The office location and each separate registry point or indication recording location is provided with a line repeater relay RP. This relay is energized, picks up, and then releases during each code step over contacts of the line relays R. Relay RP is used to energize checking relay CK, which will be discussed shortly, and to establish circuits for supplying energy from terminal N of the local source to the indication relays K when they are to be released. Contacts of relay RP are also used in other circuits for the operation of the coding apparatus, as has already become apparent, and which will be further discussed hereinafter. Relay RP is provided with four energizing circuits, each being completed when a line relay R picks up to close its front contact *b*. For example, during the first code step, and each fourth step thereafter, a circuit may be traced from terminal B over back contacts *b*, in series, of relays 4R, 3R, and 2R, front contact *b* of relay 1R, and the winding of relay RP to terminal N. During each of the three succeeding code steps, the closing of front contact *b* of one of the other line relays establishes a different energizing circuit for relay RP, the final circuit in the four step sequence including only front contact *b* of relay 4R.

Relay RP is provided with a snubbing circuit which is completed over its own front contact *a*, the snubbing circuit including a half-wave rectifier 52, which is so poled as to retard the release of the relay upon the opening of its energizing circuit. This circuit acts in the same manner as the similar circuit for transmitting relay T which was previously discussed. In conjunction with the resistor-capacitor permanently connected in multiple with the relay winding, rectifier 52 provides sufficient release time for relay RP to maintain its front contacts closed, after the active line relay releases, until certain other relay actions which depend upon these contacts are completed. It is apparent from the energizing and snubbing circuits described that relay RP is energized and picks up shortly after the beginning of each code step and is then deenergized and subsequently releases during the latter portion of the same code step.

Each registry unit is also provided with a code check relay C. During normal coding operation, that is, the continuous periodic operation of relay T with the code cycles repeating without interruption, this relay never releases, although it is deenergized near the end of each code step. The energizing circuit for relay CK extends between terminals B and N of the local source through the relay winding and over front contact *c* of line repeater relay RP. Since contact *c* of relay RP periodically closes and opens during each code step, it is obvious that relay CK. During normal coding operation, that is, the tending from near the end of each code step into the succeeding code step. However, it is provided with a slow release period sufficient to hold the relay up during the normal coding action of relay RP.

A repeater of relay CK is provided in each registry unit, the code check repeater relay CKP. This relay is energized by the circuit extending from terminal B at front contact *b* of relay CK over front contact *g* of relay PC, front contact *d* of relay 1P, and the winding of relay CKP to terminal N. It is thus apparent that relay CKP is initially energized, when the system operation is started, during the ninth code step when relays PC and 1P are both picked up. Relay CKP has a stick circuit which includes its own front contact *a* and front contact *b* of relay CK. Since relay CK does not release during normal coding action of the system, it is obvious that once energized and picked up, relay CKP will remain continuously energized with its front contacts closed. Contacts of relay CKP are found in the delivery circuits to the indication storage unit and its use therein will be discussed thereinafter during the operational description of the system.

Each registry unit is provided with three chain repeat relays designated as relays 3CR, 6CR, and 8CR, in addition to relay PC previously described. These relays operate in conjunction with the other chain relays, particularly the line stick repeater relays P. Relay 3CR picks up during code step 3 in each cycle and releases during code step 11. Relay 6CR is energized and picks up during code step 6 and releases during code step 14, while relay 8CR picks up during code step 8 and releases during code step 16. It is to be noted that the numerical portion of each relay designation indicates the code step during which these relays are energized and pick up. The circuit for energizing relay 3CR during code step 3 may be traced from terminal B over front contact *b* of relay CK, wire 47, front contact *d* of relay 3P, which is closed at this time, back contact *c* of relay 8CR, and the winding of relay 3CR to terminal N. The function of back contact *c* of relay 8CR is to prevent energization of relay 3CR during the last four steps of the code cycle when relay 3P also picks up. Relay 3CR is initially held energized by a stick circuit including front contact *b* of relay CK, wire 47, front contact *a* of relay 3CR, resistor 53, and back contact *c* of relay 8CR. When relay 8CR picks up during the eighth code step and opens its back contact *c*, the stick circuit for 3CR is transferred to include back contact *d* of relay 3P, which is closed at this time. This second stick circuit remains effective until relay 3P picks up again on the eleventh code step to interrupt the stick circuit, releasing relay 3CR.

The energizing circuit for relay 6CR is likewise traced from terminal B at front contact *b* of relay CK over wire 47, front contact *d* of relay 2P, front contact *c* of relay 3CR, and the winding of relay 6CR to terminal N. The combination of relays 2P and 3CR both picked up first occurs during the sixth step of the code so that this energizing circuit is completed at that time. The first stick circuit for relay 6CR is then established from terminal B at front contact *b* of relay CK over wire 47, front contact *a* of relay 6CR, resistor 54, front contact *c* of relay 3CR, and the winding of relay 6CR to terminal N. When relay 3CR releases during the eleventh code step, a second stick circuit for relay 6CR becomes effective over back contact *d* of relay 2P which is closed at this time bypassing the open front contact *c* of relay 3CR. When relay 2P picks up again during the fourteenth code step to interrupt this stick circuit, the open front contact *c* of relay 3CR prevents the completion of the energizing circuit for relay 6CR and this relay is then deenergized and releases during the fourteenth code step.

The energizing circuit for relay 8CR also includes front contact *b* of relay CK, and, in addition, front contact *d* of relay 4P and front contact *c* of relay 6 CR. These two latter contacts are closed simultaneously during the eighth code step so that relay 8CR is energized at that time and picks up. Closing of front contact *a* of relay 8CR establishes a stick circuit having its source at front contact *b* of relay CK and including also resistor 55 and front contact *c* of realy 6CR. When front contact *c* of relay 6CR opens during the fourteenth code step, a second stick circuit for relay 8CR, previously established, includes back contact *d* of relay 4P, which is closed at this time to bypass front contact *c* of relay 6CR. During the sixteenth code step, back contact *d* of relay 4P opens to interrupt this auxiliary stick circuit, and since front contact *c* of relay 6CR is open at this time, the closing of front contact *d* of relay 4P does not reestablish the energizing circuit so that relay 8CR is deenergized and releases during the sixteenth code step.

Contacts of relays 3CR and 6CR are found in the various indications delivery circuits, each circuit including a contact of one or the other of these relays in order to establish these circuits during the proper code step. Contacts of relay 8CR are found in the energizing circuit for pole changing relay PC, as previously discussed, and also in the various indication delivery circuits to chose between the groups during the first and second halves of the code cycle.

Each registry unit is provided with a normal and reverse indication line relay, the relays NR and RR, respectively. These relays receive and interpret information from the various field stations transferring it to the indication storage unit at the recording location. Each of these relays is of the magnetic stick, two-winding type. In this type of relay, flow of current in either winding, in the direction of the arrow shown in that particular winding symbol, causes the relay contacts to be operated to their normal or left-hand position. The flow of current in either winding, in the direction opposite to the arrow, causes the contacts to be operated to their right-hand or reverse position. The contacts of each relay remain closed in the position to which they were last operated when energy is removed from both windings. As has been indicated briefly hereinbefore, these relays are operated by pulses of current supplied from the station battery during the otherwise deenergized period of the line circuit. That is, when transmitting relay T at the office is energized so that the line battery is disconnected from the line circuit creating an off period in the coding, the station which is assigned to that particular code step supplies relative positive and negative pluses as appropriate over the line circuit from the station battery to transmit indications which are then received by these office indication line relays. The two positions of an indication function are indicated by the presence or absence of that particular pulse to which the indication is assigned.

The circuit for energizing relay NR, if a positive polarity indication pulse is received from a station, may be traced from line L1 over front contact *b* of relay RP, which is closed during the first portion of the off period of a code step, back contacts *e*, in series, of relays 1R, 2R, 3R, and 4R, front contact *d* of relay RP, the lower winding of relay NR in the direction of the arrow, and rectifier unit RE1 in its forward direction to line L2. Flow of current in this circuit is such as to cause relay NR to operate its contacts to the left-hand position closing normal contact *a*. Flow of current through the lower winding of relay RR at this time is prevented by rectifier unit RE2 which is poled to block current flow in the circuit in this direction. When the positive indication pulse from this station is terminated and a negative pulse follows, the circuit for operating relay RR may be traced from line L2 through rectifier unit RE2 in its forward direction, the lower winding of relay RR in the direction of the arrow, back contacts *e* of relays 4R, 3R, 2R, and 1R, and front contact *b* of relay RP to line L1. The flow of current in this circiut is such as to cause relay RR to operate its contacts to the left-hand position closing its normal contact *a*.

If either indication being transmitted from the station is represented by an absence of the indication pulse, there will be no flow of current in the corresponding circuit at the office and the associated relay NR or RR will not operate. To assure that the reverse contact of this relay will be closed under these conditions, a reset circuit is established for relays NR and RR during the on period of each code step, when all of the line stick repeater relays P are released. This circuit may be traced from terminal B over back contacts *e*, in series, of relays 1P, 2P, 3P, and 4P through the upper windings of the relays, in series, in the direction opposite to the arrow, to terminal N. The flow of current in this circuit is such as to cause each relay to operate its contact to the right-hand position closing reverse contact *a*. Thus both relay NR and relay RR are operated to their reverse position during the office stepping pulse and an "active" indication recorded during that code step only if the corresponding indication pulse is actually received. Contacts of relays NR and RR are found in the delivery circuits to the storage units, as will be discussed shortly. Briefly, normal contacts of these relays establish circuits for energizing the indication relays from positive terminal B of the local source, while circuits over reverse contacts are established to the negative terminal of the battery in a manner to cause the indication relays to release.

Both the master office location and the secondary recording points are provided with indication relays K which receive the indications transmitted from the stations and record them for display on the system model located at these points. These indication relays are normally outside the registry unit since they are to be furnished as required and with circuitry appropriate to the indication displays desired. A typical circuit for energizing these indication relays when an active indication has been received from the station, that is, a pulse of current has been received, may be traced from terminal B at normal contact $a$ of relay NR, which would be closed in this situation, over front contact $b$ of relay CKP, back contact $f$ of relay 8CR, wire 56, front contact $g$ of relay 1P, back contact $f$ of relay 3CR, terminal 1 of the registry unit, and the winding of relay XTK to terminal N. The indication received by relay XTK is assigned to the positive portion of the first code step so that the relay 8CR is released, relay 1P energized, and relay 3CR released at this time. When relay XTK picks up, it completes a stick circuit for itself over its own front contact $a$ and resistor 57. If during a subsequent code cycle such an active indication is not received during the first code step so that relay NR is not operated, the winding of relay XTK is shunted by a circuit traced from the left-hand terminal of the relay winding over back contact $f$ of relay 3CR, front contact $g$ of relay 1P, wire 56, back contact $f$ of relay 8CR, front contact $b$ of relay CKP, reverse contact $a$ of relay NR, and back contact $e$ of relay RP to terminal N. This shunt makes the stick circuit for relay XTK ineffective and the relay then releases. When relay XTK is energized and picks up, an obvious circuit is completed over its front contact $b$ for energizing a display lamp XTEK which is lighted to indicate the recording of an active indication. This will be more fully explained during the description of the system operation.

During the remaining portion of the first code step, if relay RR is operated by the receipt of a negative indication pulse, the registry circuit may be traced from terminal B at normal contact $a$ of relay RR, over front contact $c$ of relay CKP, back contact $g$ of relay 8CR, wire 58, front contact $j$ of relay 1P, back contact $k$ of relay 3CR, terminal 2, and the winding of relay LTK to terminal N. Relay LTK completes a similar stick circuit including its own front contact $a$ and resistor 59. If this active indication is not received during this step, the winding of relay LTK is shunted over a circuit extending from the left-hand terminal of the winding over the same path as the energizing circuit, but including reverse contact $a$ of relay RR and back contact $f$ of relay RP. Other similar circuits may be traced for the remaining code steps and would include at times front contacts $f$ and $g$ of relay 8CR, wires 62 and 63, various contacts $f$ to $j$ inclusive of relays 1P, 2P, 3P, and 4P and other contacts of relays 3CR and 6CR. These circuits will be more fully explained and discussed during the description of the system operation.

As has been previously indicated, the master control office for the system includes all of the relays discussed above and appearing on Figs. 1A and 1B. In one typical arrangement of the system, all of these relays with the exception of code transmitter CT, transmitting relay T, line repeater relay RP, and the various indication relays K are contained in registry unit to which the connections are made by external terminals. In this same typical arrangement, the indication relays K are contained in a similar unit known as the storage unit. The code transmitter, the code transmitting relay, and the line repeater relay are external to these units as is line battery LB. At a secondary recording location, only the registry unit and the storage unit would be provided plus one external relay, the line repeater relay RP. Such a secondary location would not be provided with code transmitter CT, transmitting relay T, or line battery LB. The reasons for this are obvious, since it is apparent that the system can be controlled or driven from only one location at which the line energy supply for the entire system is located. However, with this exception, the operation of the registry unit and its associated relays and of the storage unit with its indication relays is identical at the control office and at the secondary recording location.

Referring to Fig. 2A of the drawings, I shall now describe the code following apparatus, principally relays and their control circuitry which constitutes a station coding unit and which transmits indications to the office and other registry points. In addition, there are shown selected wayside relays by which the indications transmitted by a particular station are determined. The station unit is provided with four line relays which have been designated, to distinguish them from the office relays, F1R, F2R, F3R, and F4R. There are, in addition, four line stick repeater relays F1P, F2P, F3P, and F4P. These eight relays are similar to the correspondingly designated relays at the control office and function both as line relays and as a counting chain to step the local apparatus. The station unit is provided with a normal and a reverse transmitting relay, the relays NT and RT, respectively. Operating in conjunction with these transmitting relays are two capacitors CN and CR, associated respectively with relays NT and RT. Certain external terminals are also shown, with numerical designations 37 to 42, which are connected in a preselected pattern in order to establish the code steps in the cycle during which the particular station unit will operate to assure proper indications. Terminals 33 to 36 are used at times to split the two indications assigned to a particular code step between two stations to avoid waste of any of the capacity of the system. The external connections to all these terminals will be more fully discussed as the description progresses.

Line relays F1R, F2R, F3R, and F4R operate in a manner similar to the corresponding line relays at the control office. These relays pick up in sequence when the line circuit is energized with the proper polarity and release when the line is deenergized or is energized with the wrong polarity for the station. A half-wave rectifier unit RE3, connected with its forward direction from terminal 41 to terminal 42, is further connected as desired between the pairs of terminals 37—38 and 39—40 in order to establish the code steps during which the local station operates. The connections as shown in Fig. 2A, that is, from 37 to 41, 42 to 38, and 39 to 40, establish the stations of what I shall designate group A. In Fig. 2B, another pattern of connections is shown in which the terminals are connected 37 to 38, 39 to 41, and 42 to 40, establishing stations of group B. Figs. 2C and 2D show other patterns of these variable connections which establish, respectively, stations of groups C and D.

Referring now particularly to Fig. 2A, a first energizing circuit for relay F1R of that station may be traced from line L1 in the upper left of the drawing over back contact $c$ of relay NT, back contact $c$ of relay RT, the winding of relay F1R, back contact $b$ of relay F1P, the direct connection between terminals 39 and 40, back contact $b$ of relay F4P back contact $a$ of relay F4R, and back contacts $d$, in series, of relays RT and NT to line L2. It is also apparent that another circuit may be traced over front contact $b$ of relay F1P, the connection between terminals 37 and 41, rectifier RE3 in its forward direction, the connection between terminals 42 and 38, and front contact $b$ of relay F4P, the remainder of the circuit between lines L1 and L2 being as previously traced. With relays F1P and F4P released, closing their back contacts $b$, current will flow through the winding of relay F1R, so that the relay is energized and picks up, regardless of the relative polarity on line circuit L1–L2. However, with relays F1P and F4P picked up, closing front contacts $b$, current will flow and relay F1R will be energized only when line L1 is of relative positive polarity so that the current flow is from terminal 41 to terminal 42.

If the pattern of connections shown Fig. 2B is substituted into the circuit arrangement in Fig. 2A, it is apparent that relay F1R will be energized with either polarity on the line circuit with relays F1P and F4P picked up, but only when line L1 is positive if the two repeater relays are released. The substitution of the circuit arrangement of either Fig. 2C or Fig. 2D creates different requirements for the proper energization of relay F1R, which are obvious from a study of the drawings when taken in connection with the previous discussion. The operational description hereinafter will consider stations having each pattern of connections, and it is believed unnecessary to here discuss these arrangements in complete detail.

In any event, when relay F1R picks up to close its front contact $a$, a stick circuit is completed which may be traced from line L1 over back contacts $c$ of relays NT and RT, the winding and front contact $a$ of relay F1R, and back contacts $d$ of relays RT and NT to line L2. This stick circuit is effective to hold relay F1R energized until energy is removed from the line circuit at the office. It is noted at this point that any one station unit is effective to transmit indications over the line circuit only during one group of four steps of the code cycle of sixteen steps. The manner in which this is controlled will appear shortly during the description of the system operation and the transmission of indications will not be discussed at this time.

The energizing circuit for relay F2R is established when relay F1R releases during the off period of the code step and becomes effective when the line circuit is reenergized. This circuit for relay F2R may be traced from line L1 over back contacts $c$, in series, of relays NT and RT, the winding of relay FTR, back contact $c$ of relay F2P, front contact $c$ of relay F1P, back contact $a$ of relay F1R, and back contacts $d$, in series, of relays NT and RT to line L2. When relay F2R picks up, the closing of its front contact $a$ establishes a stick circuit which includes the same back contacts of relays NT and RT included in the energizing circuit for this relay. It is to be noted that these back contacts $c$ and $d$ of relays NT and RT enter into all of the energizing and stick circuits for the line relays FR. The energizing circuit for relay F3R, in addition to these contacts, includes the relay winding, back contact $b$ of relay F3P, front contact $b$ of relay F2P, and back contact $a$ of relay F2R. The energizing circuit for relay F4R includes back contact $c$ of relay F4P, front contact $c$ of relay F3P, and back contact $a$ of relay F3R. The stick circuits for the latter two line relays listed are established when front contact $a$ of the corresponding relay is closed, the stick circuits being similar to those previously traced for relays F1R and F2R.

Referring now to the line stick repeater relays of the station unit, an energizing circuit for relay F1P is completed when front contacts of relay F1R become closed. This circuit may be traced from terminal B over front contact $b$ of relay F1R, back contact $d$ of relay F4P, and the winding of relay F1P to terminal N. It is to be noted that the winding of this relay, and of the other repeater relays FP, is snubbed by a resistor-capacitor unit connected in parallel with the relay winding. The purpose of this snub is to slightly retard the release of the relay upon deenergization in order to provide proper operation of the circuits. When relay F1P picks up, it closes its front contact $a$ to establish a first stick circuit for itself which also includes back contact $d$ of relay F4P. When relay F1R eventually releases, the stick circuit is transferred to include back contact $b$ of relay F1R in place of back contact $d$ of relay F4P. The utility of this auxiliary stick arrangement will be more fully brought out hereinafter in the description of the system operation.

The energizing circuit for relay F2P is traced from terminal B at front contact $b$ of relay F2R over front contact $d$ of relay F1P and the winding of relay F2P to terminal N. A first stick circuit for this relay includes its own front contact $a$ and front contact $d$ of relay F1P, with a second stick circuit being established at a later time by the closing of back contact $b$ of relay F2R to bypass front contact $d$ of relay F1P. The energizing circuit for relay F3P includes front contact $b$ of relay F3R and front contact $d$ of relay F2P. The stick circuits for relay F3P include its own front contact $a$ and front contact $d$ of relay F2P in multiple with back contact $b$ of relay F3R. Similarly, an energizing circuit for relay F4P is traced from terminal B at front contact $b$ of relay F4R over front contact $d$ of relay F3P and the winding of relay F4P to terminal N. This relay has a stick circuit established at its own front contact $a$ and including initially front contact $d$ of relay F3P and, secondly, back contact $b$ of relay F4R bypassing the contact of relay F3P.

These line stick repeater relays at the station count the code steps in a manner similar to the corresponding relays at the office. It is to be noted that the energizing circuits for these relays are dependent upon the operation of the corresponding line relays FR. For this reason, relays FP at different stations operate on different code steps and remain energized for different periods of the code cycle in accrodance with the group to which the station belongs. Also in conjunction with the line relays, the line stick repeater relays establish the circuits for the proper transmission of the indications assigned to their particular station.

The capacitors CN and CR are used to prepare for the transmission of indications. Each of these capacitors becomes charged during a code step if the wayside relay, which determines the type of indication transmitted and which is assigned to that code step, has operated to the "active" indication position. The charging circuits are further established, according to the code step involved, by relay F1P, F2P, or F3P released or relay F4P picked up, and the corresponding line relay FR picked up. The positive battery terminal B of the local source is permanently conected to one side of each capacitor and the circuit established as just described completes the connection to the negative side of the local source allowing the capacitor to charge. When the line relays are all released, the capacitors are connected to discharge through the windings of relay NT or RT, respectively, energizing these relays which pick up. Upon the dissipation of the charge the relays will release.

Each station in the particular system here described is limited to a maximum of eight indications which may be transmitted during the four code steps which comprise the group to which the station is assigned. However, any one station may have a lesser number of indications to transmit which are assigned to a portion of these code steps of the group. As shown in Fig. 2A, the station there illustrated is used to transmit four indications to the control office. Relays XTR, LTR, RTR, and POR represent the wayside relays controlled by the two-position function to be indicated. For example, relay XTR may be the track relay of a short detector section which is energized and picked up when the track section is unoccupied, and which is released when the corresponding section is occupied by a train. Similarly, relays LTR and RTR may be associated with left and right track sections with these relays being energized or deenergized in the same manner. Relay POR may be considered to represent a power-off relay which becomes released upon the failure of a commercial alternating current source. The terminals F1 to F8, inclusive, shown in the lower right of Fig. 2A, represent the eight indications which are the maximum which the station can transmit under any circumstance. Terminal NA provides a connection to the negative terminal N of the local power source under certain conditions defined shortly. It is here assumed that the typical station shown in Fig. 2A will transmit its assigned four indications on the first and second code steps of the four step group to which this station is assigned, which for a station of group A are the first and second steps of the entire code cycle. Since there are only four indications, terminals F1, F2, F3, and F4 are the only ones utilized in the present situation.

Assuming now that the four wayside relays are released, this station must transmit what I shall call an "active" indication for each one. During the first code step, a circuit for charging capacitor CN may be traced from terminal B through resistor 64 and capacitor CN, thence over front contact c of relay F1R, front contact e of relay F4P, terminal F1, back contact a of relay XTR, terminal NA, back contact b of relay NT, and back contact a of relay RT to terminal N. At the same time, a similar circuit exists for charging capacitor CR, traced from terminal B through resistors 65 and 66 in series, capacitor CR, front contact d of relay F1R, front contact f of relay F4P, terminal F2, back contact a of relay LTR, terminal NA, back contact b of relay NT, and back contact a of relay RT to terminal N. During the next code step similar circuits are established for again charging these two capacitors, the circuit for capacitor CN including back contact c of relay F1R, front contact c of relay F2R, back contact e of relay F1P, terminal F3, and back contact a of relay RTR. The corresponding circuit for capacitor CR includes back contact d of relay F1R, front contact d of relay F2R, back contact f of relay F1P, terminal F4, and back contact a of relay POR. It is obvious that similar circuits may be established during the third and fourth code steps over contacts of line relays F3R and F4R and repeater relays F2P and F3P. The external connections over contacts of the wayside relays are completed at terminals F5 and F7 for capacitor CN and terminals F6 and F8 for capacitor CR. While none of these circuits are specifically shown, it is believed that they are obvious from a study of Fig. 2A, when taken in connection with the preceding discussion.

When the line relay at the station releases during a code step, capacitors CN and CR discharge through normal and reverse transmitting relays NT and RT, respectively. For example, with all of the line relays FR released, a circuit may be traced from the right-hand terminal of capacitor CN over back contacts c, in series, of relays F1R, F2R, F3R, and F4R and the winding of relay NT to the left-hand terminal of capacitor CN. The discharging of capacitor CN through this circuit causes current to flow through the winding of relay NT to energize the relay which then picks up. Similarly, a circuit may be traced from the right-hand terminal of capacitor CR over back contacts d, in series, of line relays F1R to F4R, inclusive, and the winding of relay RT to the left-hand terminal of capacitor CR. Again, the discharge of the capacitor in this circuit energizes relay RT which then picks up. If both relays NT and RT are energized during a code step, a stick circuit is also completed for relay RT which may be traced from terminal B over resistor 65, front contact b and the winding of relay RT, and front contacts a, in series, of relays NT and RT to terminal N. This stick circuit is effective until interrupted by the release of relay NT, as will be described shortly. The charge on capacitor CR is renewed by this stick circuit since the capacitor is connected in multiple with the relay winding over back contacts d of the line relays FR. Front contact b of relay RT is used to shunt resistor 66 so that the level of energization of relay RT and the charge on capacitor CR will be sufficient to keep front contacts of the relay closed until the indication is transmitted.

Relays NT and RT function to supply indication pulses to the line circuit during the off period of each code step as driven by the office coding units. Relay NT is used to transmit the normal or positive indication pulses by a circuit which may be traced from positive terminal B of battery 44 over terminal 33 and front contact c of relay NT to line L1, returning from line L2 over front contact d of relay NT to terminal N of the local source. Similarly, relay RT functions to transmit the reverse or negative indication pulses over a circuit which may be traced from terminal B over front contact d of relay RT and back contact d of relay NT to line L2, returning from line L1 over back contact c of relay NT and front contact c of relay RT to terminal N. It is apparent that the circuits are so arranged that a positive indication pulse transmitted due to relay NT being picked up takes precedence over the negative indication pulse transmitted by relay RT. However, the stick circuit for relay RT which was previously traced assures that if both pulses are to be transmitted during a code step, relay RT will remain energized with its front contacts closed until after relay NT releases, so that the negative indication pulse will be transmitted.

I shall now describe the operation of the system as shown in the drawings. The first portion of this operational description will deal with the initial cycle during the starting sequence since it is believed that such a description will illustrate most of the operating principles of the apparatus and that it may be sufficiently expanded by other brief specific descriptions to complete the understanding of the normal system operation. Considerable reliance will be placed during this description of the starting sequence upon frequent reference to the relay operation chart of Figs. 5A, 5B, 5C, and 5D. Reference will also be made, of course, to the office and station circuit arrangements as shown in Figs. 1A and 1B and Figs. 2A, 2B, 2C, and 2D.

The chart shows the principal relay operations at the office and/or a secondary registry point and at four stations, one station for each possible station group in accordance with the variable connections previously discussed. It is to be noted that the office is divided into two columns of relay action, one concerning the transmission of the code and the other directed principally to the code registration. The column headed "Registry Unit" in addition shows the relay operations at a secondary indication recording location which is provided only with a registry unit plus an external line repeater relay RP. The column headed "Line Coding Relays" has reference to the operation of code transmitter CT and core transmitting relay T which, with the office line battery, are provided only at the office location. It is believed that the use of these two columns will more clearly define relay operation at such locations and clearly limit the apparatus provided at a secondary recording point. The first two columns from the left indicate merely the code step number in an obvious manner and the relative polarity of the line circuit energy (L1 with respect to L2) in the specific system shown in the present case. It will be noted that each code step is divided in the second column into a period in which the line circuit is energized either positive or negative (the relative polarity of L1) and a period during which the line circuit is deenergized with respect to energy from the office line battery. The four right-hand columns represent relay operations at field stations in groups A, B, C, and D, in which the rectifier unit RE3 is connected in accordance with the patterns of variable connections illustrated in Figs. 2A, 2B, 2C, and 2D, respectively. It is to be noted that the rectifier connections for each of the lettered columns in the chart are intended to correspond exactly with the letter designation of the various parts of Fig. 2.

Figure 5B:
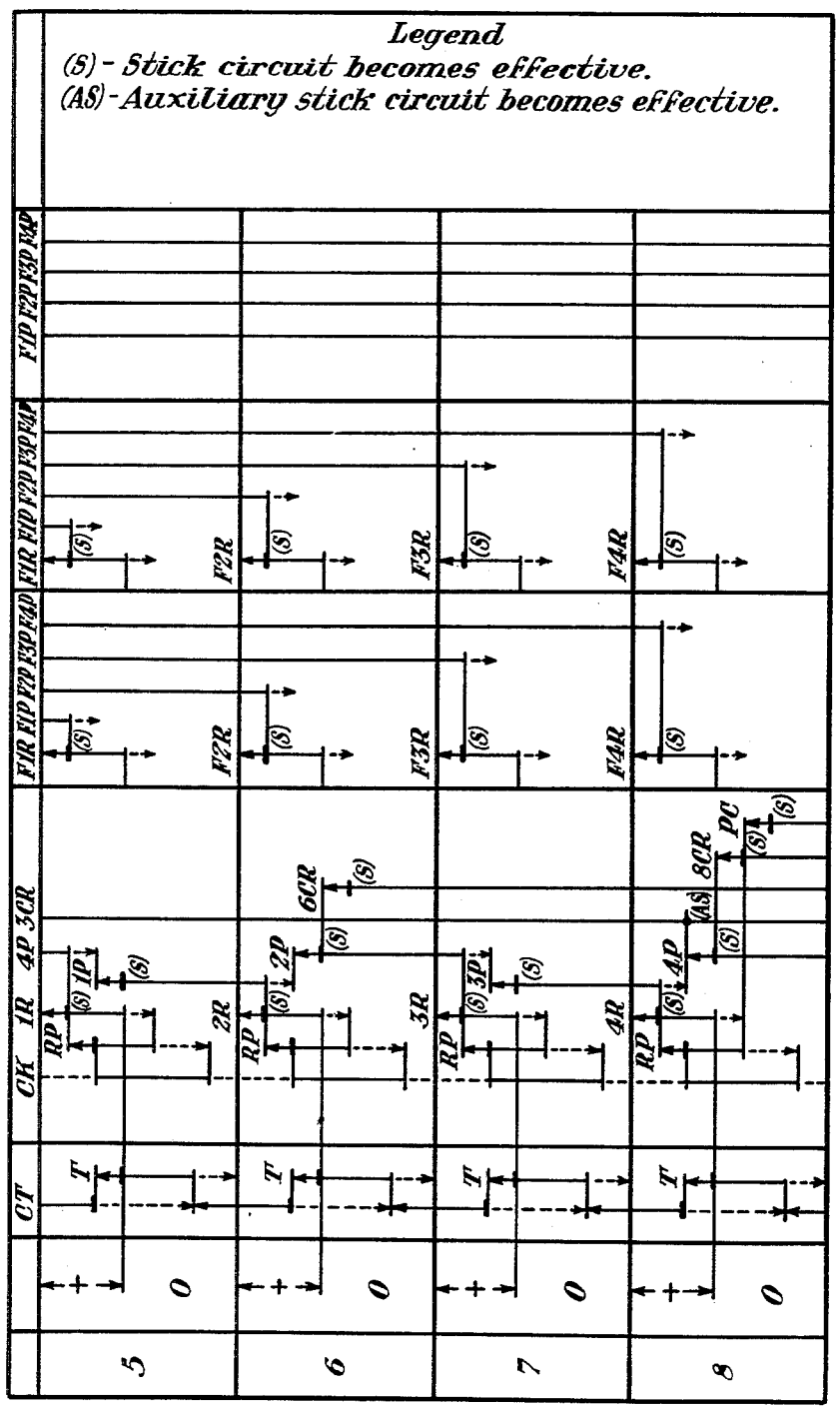

The legend at the right of Figs. 5A and 5B illustrates graphically the symbols which have been used in the chart. This space has been used, for convenience, since, as will appear later, there is no relay action at stations of group D during the first half of the initial code cycle, that is, the first eight code steps. The vertical lines, except those dividing columns, represent relay action, in accordance with the conventional symbols. Each section of vertical line is preceded by a reference designating the relay whose operation is represented. Where a vertical line on a figure is continuous, no additional reference character is shown even through the character of the action changes. However, when a line continues from one sheet to the sheet below, the relay reference is repeated at the top of the lower sheet to aid in following the chart. Each horizontal line on this chart represents the completion of certain of the relay actions immediately above and touching it and the beginning of other relay actions immediately below and touching the line. The horizontal lines are to be thus interpreted, however, only when the contact or intersection with a vertical line is marked by an arrow, a bar, a dot ( · ) and note, or a change in the character of the vertical line. In many instances, the vertical lines representing relay action intersect horizontal lines which do not pertain to that particular relay. Such intersections are not designated by any special symbol and do not represent a change in the condition of the relay. The heavy horizontal bars shown at right angles to the vertical lines indicate the point at which that relay completes is pickup and closes its front contacts. At the bottom of Fig. 5D, following code step 16, notes are appended to the chart to indicate how repeat cycles of the code differ in action from that shown for the initial cycle. This matter is further discussed in detail hereinafter.

In Figs. 1A, 1B, and 2A, the apparatus is shown in its at-rest condition, prior to the initiation of coding action. To initiate the coding action of the system, connections must be closed at the office to line battery LB and to local battery 43, both shown in Fig. 1A. At the station, the connections to the station battery may be permanently made as the operation of such units is entirely dependent upon the coding action from the office, and it is only when the office battery connections are completed that the coding action will be initiated. It is to be noted, of course, that the operation of code transmitter CT, once energized, is continuous since it is permanently connected directly across local battery terminals B and N. With the closing of the connections to the line battery, the line circuit is energized from line battery LB over back contacts $b$ and $c$ of transmitter relay T and back contacts $b$ and $c$ of relay PC.

With the energization of the line circuit L1—L2, relay 1R at the office and relays F1R at all of the field stations, except those of group D, are energized and pick up. With relay PC at the office released at this time, the polarity of the line circuit may be considered normal, that is, line L1 having the positive polarity relative to line L2. Thus, at stations of group D, with all of the line stick repeater relays released, the circuit for relay F1R includes rectifier unit RE3 in its reverse direction, so that the flow of current through relay F1R is blocked and no action occurs at such stations. However, at the remaining field stations the circuit may be traced from line L1 over back contacts $c$ of relays NT and RT, the winding of relay F1R, back contact $b$ of relay F1P, a connection between terminals 39 and 40 which may or may not include rectifier unit RE3 in its forward direction, back contact $b$ of relay F4P, back contact $a$ of relay F4R, and back contacts $d$ of relays RT and NT to line L2. At the office, since relays CK and CKP are initially deenergized, the circuit for relay 1R extends from line L1 over back contact $b$ of relay RP, back contact $b$ of relay 6CR, back contact $d$ of relay PC, back contact $c$ of relay 4R, back contact $a$ of relay CK, the winding of relay 1R, back contact $e$ of relay PC, and rectifier RE1 in its forward direction to line L2. Thus, relay 1R at the office and relays F1R at the selected field stations are properly energized and pick up.

With front contacts of relay 1R closed, the circuit at the office for energizing relay 1P is completed, this circuit including front contact $d$ of relay 1R and back contact $c$ of relay 4P, which is closed at this time. At selected stations, a similar action occurs when relay F1P is energized over a circuit which includes front contact $b$ of relay F1R and back contact $d$ of relay F4P. On this initial code step, all of the line stick repeater relays are energized and pick up at the same time, as is obvious from an examination of the chart. At each of the stations, the closing of front contact $a$ of relay F1P completes a stick circuit which initially includes back contact $d$ of relay F4P. At the office, the closing of front contact $b$ of relay 1R completes the energizing circuit for line repeater relay RP, this circuit likewise including back contacts $b$ of the other line relays 2R, 3R, and 4R. This is followed by the energization of relay CK due to the closing of front contact $c$ of relay RP. Relay CK, thus energized, picks up and the closing of its front contact $b$ completes the stick circuit for relay 1P, which circuit also includes back contact $d$ of relay 2R and front contact $a$ of relay 1P. At this point in the progression of the code, by reference to the chart, it is obvious that the first line relay at each location, that is, office, secondary recording points, and selected stations, is now picked up and has completed a stick circuit over its front contact $a$. Likewise, the line stick repeater relay 1P or F1P is energized and has completed its stick circuit.

When code transmitter CT closes its front contact $a$, transmitting relay T is energized and subsequently picks up to interrupt the line circuit at its back contacts $b$ and $c$. This removes line battery energy from the line circuit so that relay 1R at the office and relays F1R at the selected field stations are deenergized and shortly release. At the office, the release of relay 1R to open its front contact $b$ deenergizes relay RP, which, because of the rectifier snub completed over its own front contact $a$, has a somewhat slow release and thus retains its front contacts closed for the present. The eventual release of relay RP deenergizes relay CK but this relay is snubbed so as to have a sufficient slow release period that it maintains its front contacts continuously closed during coding action, as indicated on the chart showing the relay deenergized but not released. At each of the selected stations, release of relay F1R establishes the second or auxiliary stick circuit for relay F1P. In this auxiliary stick circuit, back contact $b$ of relay F1R bypasses, that is, is connected in multiple with back contact $d$ of relay F4P.

It is well to note at this time that the transmission of indications from the field stations can only occur upon release of the line stick repeater relays, and thus during this first step of the initial cycle no indications can be transmitted. Such indications could not in any event be recorded at the office since relay CKP is still released and open front contacts of this relay interrupt each of the indication recording networks. For convenience, the transmission, reception, and recording of indications will be discussed later in the specification when the description of such features is more applicable.

Code transmitter CT, which is deenergized almost immediately upon the closing of its front contacts, eventually releases, opening its front contacts to deenergize transmitting relay T which shortly releases to complete the first code step. At this instant, the line circuit is reenergized by the closing of back contacts of transmitting relay T, and the second line or counting chain relay at the office and selected stations is thus energized. In other words, at this time relays 2R and F2R are energized over the line circuit and pick up. At the office, the circuit for relay 2R, which has been previously traced, includes, in part, back contact $b$ of relay RP, back contact $c$ of relay 1R and front contact $b$ of relay 1P. Front contact $a$ of relay 2R, upon closing, completes a stick circuit for the relay which bypasses the three previously mentioned contacts of relays RP, 1R and 1P, respectively. At each of the previously selected stations, relay F2R is energized from the line circuit connection over the previously mentioned back contacts *c* and *d* of relays NT and RT, and front contact *c* of relay F1P, back contact *c* of relay F2P, and back contact *a* of relay F1R. As has been previously mentioned, the closing of front contact *a* of relay F2R completes a stick circuit for this relay which bypasses the three last mentioned contacts in the energizing circuit.

At the station, the closing of front contacts of relay F2R completes the energizing circuit for relay F2P, this circuit including front contact *b* of relay F2R and front contact *d* of relay F1P. The closing of front contact *a* of relay F2P, as previously discussed, completes an initial stick circuit for the relay which bypasses front contact *b* of relay F2R. At the office, the opening of back contact *d* of relay 2R interrupts the stick circuit for relay 1P which shortly releases, thereby completing the energizing circuit for relay 2P at back contact *c* of relay 1P, the circuit further including front contact *d* of relay 2R, wire 47, and front contact *b* of relay CK which is retained closed at this time. It is to be noted that, at the stations, the corresponding first line stick repeater relay F1P is not deenergized at this time since its auxiliary circuit and its initial stick circuit are both still completed. At the office, the closing of front contact *b* of relay 2R completes another circuit for energizing relay RP which once again picks up, thereby reenergizing relay CK. This pickup and release of relay RP and the resulting energization and deenergization of relay CK occurs during each code step, as may be observed from a study of the relay operation chart. It is therefore believed unnecessary to fully discuss this portion of the operation for each code step, and only brief references to these relays will be made hereinafter. It has already been mentioned that relay CK, having been energized during the first code step and having picked up to close its front contacts, retains these front contacts closed as long as the coding action remains continuous.

Again, in the continuous operation of code transmitter CT, its front contact *a* is closed so that transmitting relay T is energized and picks up, opening its back contacts to deenergize the line circuit, thereby deenergizing relays 2R and F2R which release. At the stations, the release of relay F2R to close its back contact *b* completes the auxiliary stick circuit for relay F2P. This action is followed in the continuous cycle by the opening of front contact *a* of transmitter CT and the subsequent release of relay T to again close the line circuit.

At the beginning of code step 3, with the line circuit again closed, office relay 3R and relays F3R at stations in groups A, B, and C are energized and pick up. At the stations, the energizing circuit for relay F3R includes front contact *b* of relay F2P and back contact *b* of relay F3P, as well as back contact *a* of relay F2R. At the office, the circuit for relay 3R at this time extends from line L1 over back contact *b* of relay RP, back contact *b* of relay 3CR, back contact *e* of relay 8CR, back contact *c* of relay 2R, front contact *b* of relay 2P, which is still closed, the winding of relay 3R, back contact *e* of relay PC and rectifier unit RE1 to line L2. The closing of front contact *a* of relay 3R establishes a stick circuit which bypasses everything in the energizing circuit ahead of the relay winding. At the stations, the closing of front contact *b* of relay F3R completes the energizing circuit for relay F3P, this circuit including front contact *d* of relay F2P, and relay F3P picks up, completing its initial stick circuit at its own front contact *a*. At the office, the opening of back contact *d* of relay 3R interrupts the stick circuit for relay 2P which releases, closing its back contact *c* to establish the energizing circuit for relay 3P, this latter circuit also including front contact *b* of relay CK and front contact *d* of relay 3R. Relay 3P closes its front contact *a* to complete its stick circuit over back contact *d* of relay 4R.

The closing of front contact *d* of relay 3P completes the circuit for energizing chain repeat relay 3CR, this circuit extending from terminal B at front contact *b* of relay CK over wire 47, front contact *d* of relay 3P, back contact *c* of relay 8CR, and the winding of relay 3CR to terminal N. The closing of front contact *a* of relay 3CR completes an initial stick circuit which bypasses front contact *d* of relay 3P.

Code step 3 continues, relay T picking up to interrupt the line circuit in the usual manner to cause the release of relays 3R and F3R at the office and selected stations. At the stations, the closing of back contact *b* of relay F3R completes the auxiliary stick circuit for relay F3P which also includes front contact *a* of the latter relay. These actions are followed by the release of relay T to again close the line circuit to begin the fourth code step by the energization of line relays 4R and F4R. The circuit for relay F4R is similar to that previously traced for the other line relays at the selected stations except for including back contact *c* of relay F4P, front contact *c* of relay F3P, and back contact *a* of relay F3R. The closing of front contact *a* of relay F4R then bypasses this portion of the energizing circuit. At the office, the circuit for relay 4R at this time checks that relay 3CR is picked up and relay 8CR is released, the circuit for relay 4R specifically including front contact *b* of relay 3CR, back contact *d* of relay 8CR, back contact *c* of relay 3R, and front contact *b* of relay 3P. The opening of back contact *d* of relay 4R deenergizes relay 3P which releases, closing back contact *c* to complete the energizing circuit for relay 4P, the circuit also including front contact *d* of relay 4R and front contact *b* of relay CK. At the stations, front contact *b* of relay F4R closes to complete the energizing circuit for relay F4P, this circuit also including front contact *d* of relay F3P. Relay F4P picks up prior to the pickup of relay 4P, but this timing is immaterial to the operation of the system. It is to be noted that, at each of the selected field stations, all of the line stick repeater relays are still energized, being held in this condition by at least one of their stick circuits. The opening of back contact *d* of relay F4P interrupts the initial stick circuit for relay F1P, but this relay is held energized by its auxiliary stick circuit over back contact *b* of relay F1R. Relay T now picks up to open the line circuit, releasing line relays 4R and F4R in a manner similar to the other code steps. Likewise, the release of relay F4R completes the auxiliary stick circuit for relay F4P.

At the beginning of the fifth code step in this initial cycle, relay 1R at the office is again energized although the circuit previously traced is now changed to include front contact *b* of relay 4P, which is closed at this time, instead of back contact *a* of relay CK, which is now open. Front contact *b* of relay 4P is normally included in the energizing circuit for relay 1R except during the initial code step of the starting cycle. As was previously discussed, relay CK normally remains picked up so that its back contacts are open during continuous coding action. The opening of back contact *d* of relay 1R interrupts the stick circuit for relay 4P which shortly releases, thereby completing the energizing circuit for relay 1P, this circuit including back contact *c* of relay 4P and front contact *d* of relay 1R, as previously traced. Relay 1P picks up, closing its front contact *a* to complete the usual stick circuit. The remainder of the actions at the office location during this code step are identical with those previously described.

At stations of the A and B groups, relay F1R is again energized at this time. The circuit extends from line L1 over back contacts *c* of relays NT and RT, the winding of relay F1R, front contact *b* of relay F1P, a connection between terminals 37 and 38, front contact *b* of relay F4P, back contact *a* of relay F4R, and back contacts *d* of relays RT and NT to terminal L2. At stations of the A group, the connection between terminals 37 and 38 includes rectifier unit RE3 in its forward direction, while at stations of the B group a direct connection is made between terminals 37 and 38. In each case, current flows in the traced circuit through the winding of relay F1R so that this relay picks up. However, tracing the similar circuit at stations of the C group, the connection between terminals 37 and 38 includes the rectifier in its reverse direction so that no current flows and relay F1R remains released. At this time, the stations in the D group having remained inactive during the first four steps, the circuit for relay F1R is over back contacts *b* of relays F1P and F4P and thus includes the rectifier in its reverse direction so that again no action occurs at such stations. At stations of the C group, since no action occurs, the existing conditions are continued, that is, all of the line stick repeater relays remain energized and picked up. At stations of the A and B groups, the opening of back contact *b* of relay F1R interrupts the auxiliary stick circuit for relay F1P which then releases.

At the stations of the A and B groups, the combination of relay F1R picked up with relay F4P also up completes a circuit for energizing the capacitors CN and CR if the external connections are made. Similar circuits will be completed at these stations during steps 6, 7, and 8 of this group. However, indications can not be recorded at the office since relay CKP is still released. During this portion of the initial code cycle, this released condition of relay CKP prevents the incorrect recording of indications transmitted from two stations, one in each of the groups A and B, at the same time. However, as previously mentioned, the transmission of indications is more appropriately discussed at a later point in the description of the system operation, and such description is thus delayed until that point.

The fifth code step completes in the usual manner and relay T releases, closing its back contacts to start code step 6. At the office, relay 2R is energized and picks up, relay 1P releases, and relay 2P is thus energized and picks up as previously discussed. The closing of front contact *d* of relay 2P completes the energizing circuit for relay 6CR. This circuit includes front contact *b* of relay CK, wire 47, front contact *d* of relay 2P, front contact *c* of relay 3CR which is closed, and the winding of relay 6CR. Thus energized, relay 6CR picks up closing its front contact *a* to bypass front contact *d* of relay 2P and thus complete a stick circuit. At the A and B stations, relay F2R is energized. However, the circuit at this time differs from the previously traced circuit in including back contact *c* of relay F1P and front contact *c* of relay F2P, this combination being reversed from that used in the first code step. The opening of back contact *b* of relay F2R interrupts the auxiliary stick circuit for relay F2P and since the initial stick circuit for this relay was interrupted previously at front contact *d* of relay F1P, relay F2P releases at this time. The opening of front contact *d* of relay F2P opens the initial stick circuit for relay F3P, but its auxiliary stick circuit holds this latter relay energized.

The relay action during the seventh code step is similar to that described during step 3. Relays 3R and, at the selected stations, F3R pick up in the usual manner. However, at the office, the circuit for relay 3R differs from the circuit previously traced in that it checks the proper progression of the code, particularly that chain repeat relay 6CR has picked up, by including front contact *b* of relay 6CR and back contact *f* of relay PC in the energizing circuit in place of back contact *b* of relay 3CR and back contact *e* of relay 8CR, as initially. At the station, the opening of back contact *b* of relay F3R interrupts the auxiliary stick circuit for relay F3P which then releases. It is to be noted that the opening of front contact *d* of relay F3P interrupts the initial stick circuit for relay F4P which is now held energized by its auxiliary stick circuit only. At the office, relay 2P is deenergized and releases, thus completing the circuit for relay 3P which picks up and completes its own stick circuit. Other action is as previously described.

At the beginning of code step 8, relay 4R and, at the selected stations, relays F4R are energized and picked up. The opening of back contact *b* of relay F4R deenergizes relay F4P which then releases to complete the dropout at the stations of the A and B groups. At the office, the opening of back contact *d* of relay 4R interrupts the stick circuit for relay 3P which subsequently releases. The closing of back contact *d* of relay 3P completes an auxiliary stick circuit for relay 3CR which also includes front contact *b* of relay CK and front contact *a* of relay 3CR. Relay 4P is energized at this time by the closing of back contact *c* of relay 3P. When relay 4P picks up, the closing of its front contact *d* in combination with the already closed front contact *c* of relay 6CR completes the energizing circuit for relay 8CR, which then picks up, closing its own front contact *a* to complete an initial stick circuit.

Relay T also picks up, opening the line circuit to release relay 4R and relays F4R at the stations. The closing of back contact *b* of relay 4R completes the energizing circuit for pole changing relay PC, this circuit including in addition front contact *b* of relay 8CR. Relay PC picks up, and the closing of its own front contact *a* completes a stick circuit including also the relay winding and front contact *b* of relay 8CR. The pickup of relay PC to close its front contacts *b* and *c* in place of the corresponding back contacts prepares for the pole changing of the line circuit as soon as relay T is again released. It is to be noted that this pole changing action occurs during the period when the line circuit is deenergized, so that no spurious effects can occur. This completes the first half of the initial code cycle during which the driving impulses, as controlled by the operation of relay T, were all of relative positive polarity. The line circuit is now prepared, for the remaining half of the code, to supply code pulses of the opposite or relative negative polarity. It may be noted from the relay operation chart that the stations of the A and B groups have now completed a dropout so that all of the line stick repeater relays are again released. No action has yet occurred at the field stations in the D group and those stations of the C group remain with their line stick repeater relays all energized.

Relay T releases to initiate the ninth code step during which the line, as previously discussed, has a negative polarity. At the office, relay 1R picks up. The circuit now extends from line L2 over rectifier RE2 in its forward direction, front contact *e* of relay PC, the winding of relay 1R, front contact *b* of relay 4P, back contact *c* of relay 4R, front contact *f* of relay PC, front contact *b* of relay 6CR, and back contact *b* of relay RP to line L1. Front contact *a* of relay 1R closes to complete a stick circuit which bypasses that portion of the energizing circuit described following the relay winding. The opening of back contact *d* of relay 1R deenergizes relay 4P which then releases and closes its back contact *c* to energize relay 1P in a manner previously described. Relay 1P likewise completes its own stick circuit, previously described, at first contact *a*. The closing of front contact *d* of relay 1P completes the energizing circuit for code check repeater relay CKP, this circuit including front contact *b* of relay CK, front contact *g* of relay PC, front contact *d* of relay 1P, and the winding of relay CKP. When this latter relay picks up, it closes its front contact *a* to complete a stick circuit, from front contact *b* of relay CK, which retains relay CKP continuously energized during the coding action as it repeats through cycle after cycle. With relay CKP picked up, the office is now ready to record indications received from the stations. It will be seen in the following description that the release of the line stick repeater relays at the stations is now by groups of stations so that indications during the last half of this initial code cycle are possible. However, in keeping with the previous decision, the actual transmission of such indications will be discussed hereinafter at a more appropriate time.

At the beginning of code step 9, relays F1R at stations of the A, C, and D groups are energized. In stations of the B group, at which the FP relays are released, rectifier unit RE3 is poled in the wrong direction to allow flow of current from line L2 to line L1, so that the first line relays at these stations are not energized. The rectifier units RE3 at stations in the C and D groups are properly poled to permit the flow of current. This action also checks that the line stick repeater relays are properly positioned at these stations, that is, picked up at stations of the C group and released at stations of the D group. At A group stations, the rectifier unit is not in the energizing circuit for relay F1R since relays F1P and F4P are released at such stations. At A and D stations, the closing of front contact b of relay F1R energizes relay F1P which picks up and completes its usual stick circuit. At C stations, the opening of back contact b of relay F1R interrupts the auxiliary stick circuit for relay F1P which then releases, the initial stick circuit for the relay being open at back contact d of relay F4P.

Figure 5C:
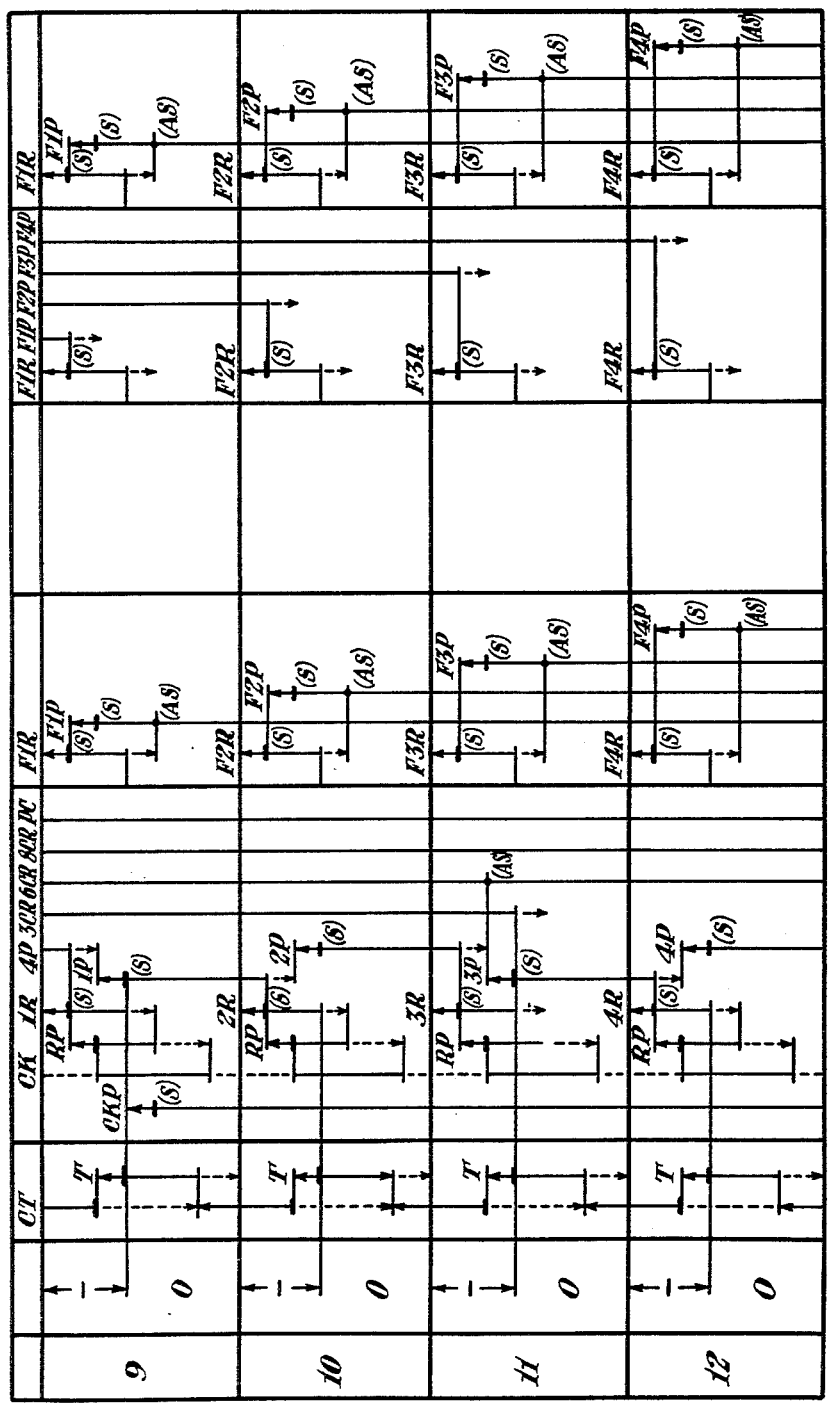

The relay action during code step 10 is obvious from a study of the chart on Fig. 5C. Briefly, at the office, relay 2R is energized over obvious circuits and causes the deenergization and release of relay 1P. This action is followed by the completion of the energizing circuit for relay 2P which then picks up. At stations of the A and D groups, relay F2R picks up, causing relay F2P to be energized and also pick up, relay F1P remaining energized by its stick circuits. At stations of the C group, relay F2R likewise picks up but interrupts the auxiliary stick circuit for relay F2P, and the initial stick circuit having already been interrupted by the release of relay F1P, relay F2P releases at these stations.

During step 11, relays 3R and F3R at the office and stations are energized as the code progresses. At stations A and D, the pickup of relay F3R completes energizing circuits for relay F3P which likewise picks up, completing its stick circuit, with the release of relay F3R later during the step completing the auxiliary stick circuit for the line stick repeater relay. At station C, the picking up of relay F3R interrupts the auxiliary stick circuit for relay F3P which shortly releases. At the office, the energizing circuit for relay 3R checks as to proper code progression by including at this time front contacts b and d of relays 3CR and 8CR, respectively, in addition to the portions of the circuit previously mentioned. The opening of back contact d of relay 3R interrupts the stick circuit for relay 2P which shortly releases. This completes an auxiliary stick circuit for relay 6CR which includes front contact b of relay CK, front contact a of relay 6CR, and back contact d of relay 2P. This auxiliary stick circuit is effective to hold relay 6CR energized when relay 3CR shortly releases to open its front contact c. The release of relay 2P is likewise followed by the energization and resulting pickup of relay 3P in the manner previously described. With back contact c of relay 8CR already open, the opening of back contact d of relay 3P interrupts the auxiliary stick circuit for relay 3CR and this latter relay releases at this time. The code step then completes in the usual manner with the release of the usual relays.

When the line circuit is reenergized to initiate code step 12, relay 4R at the office is energized, the circuit at this time including back contact b of relay 3CR and front contact e of relay 8CR to check that proper progression of the code has occurred. At the selected stations, relay F4R is energized and picks up resulting in relay action which may be determined by observation of the relay chart. This action, as will be obvious, completes the pickup of the line stick repeater relays at stations A and D and completes the dropout process of the similar relays at station C.

As the initial code cycle progresses into step 13, the operation of the line relay counting chain at the office and at certain selected stations is repeated. At the office, relay 1R is again energized over the same circuit traced for this relay at the beginning of code step 9, this circuit checking that relays 6CR and PC are picked up. The opening of back contact d of relay 1R deenergizes relay 4P which then releases. The closing of back contact d of relay 4P completes the auxiliary stick circuit for relay 8CR, this circuit further including front contact a of relay 8CR and front contact b of relay CK. At the stations of the A and B groups, energization of relay F1R is blocked by rectifier unit RE3, the unit being included in the circuit at both stations as is apparent by considering the position, as shown on the chart, of the line stick repeater relays at these stations. In other words, at station A all such relays are picked up and holding at this time, while at station B all relays are released and no action is occurring. At stations C and D, where the line stick repeater relays are, respectively, released and picked up, rectifier unit RE3 is not in the circuit for relay F1R which thus is energized and picks up. At station C, the pickup of relay F1R causes the energization of relay F1P, while at station D the pickup of relay F1R deenergizes relay F1P which then releases, these actions having been previously described for other code steps.

At the beginning of code step 14, relay 2R and relays F2R at the selected stations are energized and picked up. At station C, this results in the energization of relay F2P which picks up and completes its own stick circuit. At station D, the pickup of relay F2R interrupts the auxiliary stick circuit for relay F2P which then releases. At the office, relay 1P is deenergized and releases, resulting in the energization of relay 2P which then picks up. The opening of back contact d of relay 2P, with front contact c of relay 3CR already open, interrupts the auxiliary stick circuit for relay 6CR, and since the energizing circuit is likewise interrupted, the relay is deenergized and releases. This code step then completes in the usual manner as has previously been described for other steps.

The application of a negative code pulse to the line circuit at the beginning of step 15 energizes relay 3R at the office and relays F3R at the selected stations. At this time, the energizing circuit for relay 3R checks relay PC energized and relay 6CR deenergized, the circuit including front contact d of the former relay and back contact b of the latter relay. All other energizing circuits for relay 3R are open at this time so that the proper progression of the code cycle is checked before relay 3R may pick up. At the office, relay 2P releases and this is followed by the energization and pickup of relay 3P in the usual manner. At station C, line stick repeater relay F3P is energized and picks up, completing its usual stick circuit, while at station D, relay F3P is deenergized by the opening of back contact b of relay F3R and the stick repeater relay releases. Again this code step completes in the usual manner as is obvious from an inspection of the operation chart.

When the line circuit is again energized with negative polarity to begin the sixteenth and final step of the initial code cycle, relays 4R at the office and F4R at stations C and D are energized and picked up. The circuit for relay 4R checks that chain repeat relay 3CR is released and that chain repeat relay 8CR is picked up. Tracing this circuit as previously described from line L2 to the winding of relay 4R, it then extends over front contact b of relay 3P, back contact c of relay 3R, front contact e of relay 8CR, back contact b of relay 3CR, and back contact b of relay RP to line L1. At station C, the closing of front contact b of relay F4R energizes relay F4P which picks up and completes the usual stick circuit previously traced. At station D, the opening of back contact b of relay F4R, with front contact d of relay F3P already open, deenergizes relay F4P so that this relay releases shortly. At the office, relay 3P releases, deenergized by the opening of back contact d of relay 4R. With front contact d of relay 4R closed, relay 4P is energized by the closing of back contact c of relay 3P in the usual manner and relay 4P picks up, completing its stick circuit which includes back contact d of relay 1R. With front contact c of relay 6CR already open, the opening of back contact d of relay 4P interrupts the auxiliary stick circuit for relay 8CR, and since the energizing circuit is likewise open, relay 8CR releases. The resultant openings of front contact b of relay 8CR deenergizes relay PC which likewise releases. It may be seen from an inspection of the chart that the release of relay PC occurs during the time that relay T is picked up, so that the pole changing of the line circuit occurs during the line deenergized period, thus preventing any spurious pulses and surges in the line circuit. The sixteenth step completes in the usual manner with relays 4R at the office and F4R at stations C and D releasing due to the deenergization of the line circuit when relay T picks up. Relay RP at the office likewise is deenergized and releases near the end of the code step, deenergizing relay CK.

This completes the initial code cycle of the indication system of my invention with the stations and office and other secondary recording locations prepared for the continuation of the code. The office unit remains with line stick repeater relay 4P, code checking relay CK, and its repeater relay CKP picked up. It may be seen from the chart that relay CK is actually deenergized at the completion of the code cycle but, as previously described, this relay is sufficiently snubbed that it will remain with its front contacts closed during its period of deenergization until relay RP again closes its front contact c. The units at stations A and C remain with all of their line stick repeater relays picked up, each of the relays at these stations being held energized by their auxiliary stick circuits which include back contact b of the correspondingly numbered line-chain relay. The units at stations B and D are completely inactive with all of the relays released, that is, all of the line and counting chain relays FR and all of the line stick repeater relays FP are in their released position. It is also to be noted that with the exception of the three relays previously mentioned, and eliminating relays NR and RR from consideration, all of the relays at the office location within the registry unit are, at the close of the code cycle, in their released position, that is, the position shown in the drawings.

The operation of code transmitter CT and transmitting relay T is continuous in the manner described previously and as shown in the third column of the operation chart. An inspection of Fig. 1A obviously confirms this statement since transmitter CT is permanently connected across the battery terminals as has been previously mentioned, and transmitting relay T is a direct front contact repeater of the code transmitter. Thus, once initiated, the code cycle, here shown as sixteen steps, repeats again and again unless the connections to the local battery at the office location are interrupted or broken. Referring to the bottom of Fig. 5D, the notes appended at the end of the operation chart also amplify the continuous nature of the coding cycle. As indicated by these notes, the cycle of operation of the registry unit repeats in an identical or nearly identical manner. There are three minor exceptions to the exact repetition of the initial code cycle. As noted, relays CK and CKP are picked up at the end of the initial cycle and these relays remain continuously up as long as the continuous coding remains in effect. It is to be remembered that relay CK, although periodically deenergized by the release of relay RP, is snubbed to have a sufficiently slow release period to bridge the deenergized period so that its front contacts remain closed. Relay CKP remains continuously energized by the stick circuit including its front contact a and front contact b of relay CK. During the first code step of each repeated cycle of the continuous code, relay 1R at the office is energized by the circuit which includes front contact b of relay 4P rather than back contact a of relay CK, which, of course, is open after the first step of the initial cycle. Also, the energization of relay 1P at the office during the first code step is delayed until relay 4P releases as is the case during the initial cycle on code steps 5, 9, and 13. This operation results due to relay 4P remaining energized and picked up at the end of the sixteenth step.

Stations of groups B and D repeat their coding cycles exactly as shown in the chart of Figs. 5A, 5B, 5C, and 5D. Stations of group C, as previously described, end the initial code cycle with all of the line stick repeater relays FP picked up. Referring to Fig. 2C, it will be seen that the energizing circuit for relay F1R at such stations is blocked by rectifier unit RE3 while the line circuit polarity is positive, that is, line L1 is positive with respect to line L2. It is not until that the line polarity is reversed that the circuit at station C becomes effective to energize relay F1R so that the pickup of this relay is delayed after the initial cycle and during each subsequent code cycle until code step 9. Thus, the dropout of relays FP at such stations occurs during code steps 9 to 12, inclusive. These same relays are reenergized in succession during the following four code steps, that is, steps 13 to 16, inclusive, as shown in the initial cycle. Thus each repeat cycle of operation at station C is similar to the last half of the initial cycle, there being no energization of relays FR during the first half of the cycle. In other words, the line stick repeater relays at station C are energized in sequence during steps 13 to 16 and hold until the next cycle, releasing during steps 9 to 12, inclusive.

Figure 5D:
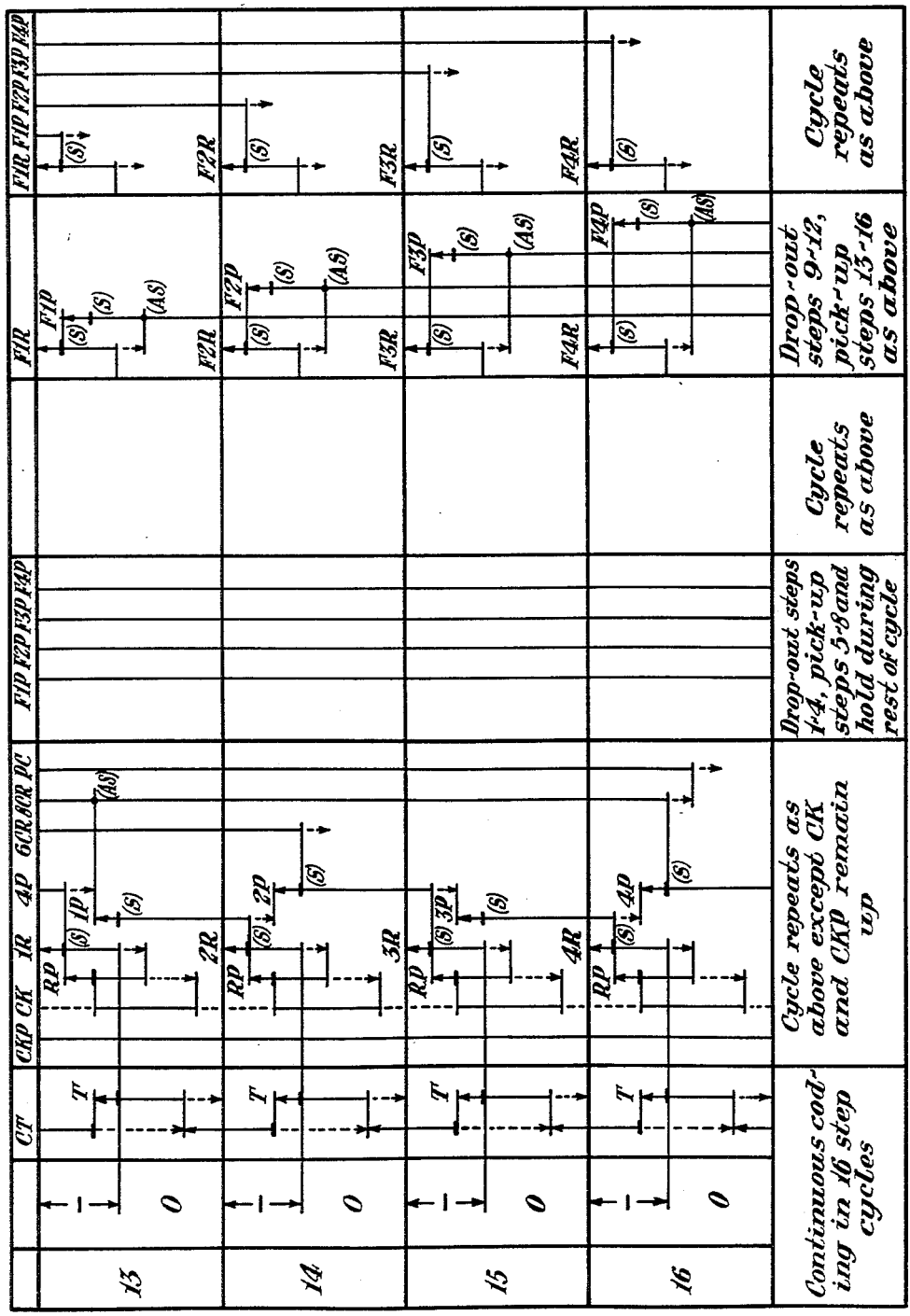

The repeat cycles for stations of group A are considerably different from that shown for the initial code cycle. Referring to Fig. 5D, it is seen that the line stick repeater relays at station A are all picked up at the close of the initial cycle. Referring to Fig. 2A, it will be seen that the energizing circuit for relay F1R at such stations under these conditions is effective during the first code step of the following cycle since the line polarity is positive. Relay F1R thus picks up and initiates the dropout of the line stick repeater relays of such stations which occurs during steps 1 to 4, inclusive. On step 5, with the relays F1P and F4P released, it is obvious that the energizing circuit for relay F1R will again be effective so that the relay picks up. This initiates the sequential pickup of the line stick repeater relays occurring during steps 5 to 8, inclusive. However, with front contacts of relays F1P and F4P closed, the energizing circuit for relay F1R, with the line polarity reversed, is ineffective on code step 9 since the flow of current is blocked by rectifier unit RE3. Such blocking action continues as long as the line polarity remains reversed which includes the entire second half of each code cycle. Thus, after the initial code cycle, the cycle of operation for stations A is such that the line stick repeater relays drop out during steps 1 to 4, inclusive, pick up during the following four steps 5 to 8, inclusive, and remain held up during the remainder of each code cycle until the first four steps of the subsequent cycle.

It is to be remember that a station transmits indications only during the period that its line stick repeater relays progress through sequential dropout. Reviewing the description of the two preceding paragraphs, and with reference to the operational chart, it is obvious that stations of group A may thus indicate during code steps 1 to 4 of each repeating cycle. Stations B transmit their indications to the office during code steps 5 to 8, while stations of the C and D groups indicate during steps 9 to 12 and 13 to 16, respectively. Interference between the various station groups during the transmission of indications is thus avoided. It is also apparent that this information bears out the previous description that stations C and D may transmit indications even during the initial code cycle. The transmission of indications from a station to the office and/or to any secondary indication recording location will now be discussed in greater detail.

Assuming that the second code cycle is starting, I shall described specifically the transmission of indications from the station shown in Fig. 2A. It will be further assumed that the wayside relays shown in Fig. 2A are at this time all released. In other words, it may be said that these relays all have "active" indications to transmit to the office. When relay F1R picks up on the first code step, with relay F4P already up, circuits are completed for charging capacitors CN and CR. The circuit for capacitor CN may be traced from terminal B over resistor 64 and capacitor CN, front contact c of relay F1R, front contact e of relay F4P, terminal F1, back contact a of wayside relay XTR, terminal NA, back contact b of relay NT, and back contact a of relay RT to terminal N. A similar circuit for charging capacitor CR includes the resistors 65 and 66, front contact d of relay F1R, front contact f of relay F4P, terminal F2, back contact a of relay LTR, and thence over terminal NA and as previously traced to terminal N of the source. The resistors 64 and the combination 65, 66 limit the current flow in these circuits during the charging of the capacitors. As previously described, relay F1R is deenergized and releases when the line circuit is deenergized due to the pickup of transmitting relay T at the office. The opening of front contacts c and d of relay F1R interrupts the charging circuits for capacitors CN and CR, respectively, and completes circuits over corresponding back contacts for energizing the transmitting relays NT and RT at this station. The circuit for relay NT includes back contact c of all line relays F1R to F4R, inclusive, the winding of relay NT, and capacitor CN. A similar circuit for relay RT includes back contacts d of all of the line relays and capacitor CR. If both relays are picked up, a stick circuit is likewise completed for relay RT, which includes front contact b of relay RT and front contacts a of relays NT and RT. This circuit holds relay RT energized and likewise operates to hold the charge on capacitor CR, the circuit through capacitor CR and back contacts d of the line relays being connected in multiple with the winding of relay RT at this time. The utility of this arrangement will appear shortly as the discussion proceeds.

With relays NT and/or RT picked up, the station unit transmits indication pulses over the line circuit during the normally deenergized portion of the code step. These indication pulses are of positive or negative polarity as controlled by relays NT and RT, respectively. With relay NT picked up, a positive pulse is transmitted over front contacts c and d of this relay, the positive terminal B of the local battery being connected to line wire L1 over front contact c and the negative terminal N over front contact d. It is apparent from the circuit arrangement that the positive indication pulse has preference, that is, the closing of front contacts of relay NT overrides the closing of front contacts of relay RT in the circuit arrangement shown. When the charge on capacitor CN is dissipated, relay NT releases and if relay RT is at that time picked up, the negative indication pulse may be transmitted over front contacts c and d of relay RT and back contacts c and d of relay NT, it being obvious that the line polarity is reversed by this arrangement. The release of relay NT also interrupts the stick circuit for relay RT by opening its front contact a, and relay RT then remains energized until the charge on capacitor CR dissipates, at which time it likewise releases, terminating the negative indication pulse.

The indication pulses supplied by the station battery are of an energy level below that of the master code pulses transmitted from the control office. Each indication pulse if of sufficient energy only to operate the proper office receiving relay. If this reduced level of energy is not maintained, some line relays at other stations not transmitting indications on that step may receive sufficient energy to pick up. This will incorrectly step the corresponding station unit so that an out-of-correspondence condition occurs and interference in the transmission of indications results.

At the office, at the beginning of the first code step, the release of relay 4P completes the circuit, including, in series, back contacts e of the line stick repeater relays and the upper windings of relays RR and NR which resets the relays to their reverse position preparatory to receiving any active indications transmitted by the station. The positive indication pulse received from the station of Fig. 2A during the deenergized portion of the first code step energizes relay NR with the current flow in he direction to operate this relay to its normal position. This circuit is traced from line wire L1 over front contact b of relay RP, back contacts e, in series, of all the line relays R, front contact d of relay RP, the lower winding of relay NR in the direction of the arrow, and rectifier unit RE1 in its forward direction to line wire L2. The circuit through the lower winding of relay RR is blocked by rectifier unit RE2 which is poled to oppose the flow of any current in this parallel path. The following negative indication pulse energizes relay RR over a similar circuit which includes rectifier RE2 in its forward direction and the lower winding of relay RR, the flow of current being such with this negative pulse that relay RR is operated to its normal position. Rectifier RE1 blocks the flow of current at this time through the winding of relay NR. It is thus seen that these two rectifier units function during the indication portion of each code step to assure the proper operation of relays NR and RR.

With normal contacts a of relays NR and RR closed, the indication recording circuits for relays XTK and LTK are completed over front contacts b and c, respectively, of relay CKP. These circuits have been previously traced and during this first code step suply energy to terminals 1 and 2 for energizing the proper indication recording relays which results in the lighting of lamps XTEK and LTK, respectively, as has previously been described.

During the second code step, at the field station of Fig. 2A, circuits are completed when relay F2R picks up for again charging capacitors CN and CR. The circuit for the former capacitor includes in this case back contact c of relay F1R, front contact c of relay F2R, back contact e of relay F1P which is closed at this time, terminal F3, and back contact a of relay RTR. A similar circuit for capacitor CR is completed over back contact a of relay POR, terminal F4, back contact f of relay F1P, and front contact d of relay F2R. Again, the positive and negative indication pulses are transmitted in sequence as described for step 1. At the office relays NR and RR are energized in sequence in a manner to close their normal contacts with the same circuits functioning as described or traced during the reception of indications on code step 1. In this instance, recording relays RTK and POK are energized over similar circuits which at this time include front contacts g and j of relay 2P and back contacts f and k of relay 6CR, energy being supplied over terminals 3 and 4 through the external connections to the recording relays. The closing of front contacts b of these two relays energizes lamps RTEK and POEK, respectively, to provide the visual indications.

I shall now assume that during the next code cycle relay XTR at the station of Fig. 2A is energized due to the corresponding track circuit having been cleared by the train previously occupying the section. With back contact a of relay XTR open, capacitor CN is not charged when relay F1R picks up, so that relay NT is not energized when relay F1R releases to close its back contact c. In this case, only the negative indication pulse is transmitted due to relay RT being energized, it being assumed that relay LTR is still released. At the beginning of the code step at the office relays NR and RR are operated to their reverse position over the previously traced circuit including back contacts e of the line stick repeater relays. With only the negative indication pulse being received, only relay RR is energized so as to operate its contacts to their normal position. Relay LTK thus remains energized over the previously traced circuit. However, with relay NR remaining reversed, the release of relay RP near the end of the first code step causes the winding of relay XTK to be shunted so that this indication recording relay releases. It will be remembered that once energized, relay XTK was held energized over a stick circuit including its own front contact a and resistor 57. At this time, a circuit is completed from the junction at the left-hand terminal of the winding of relay XTK over terminal 1, back contact f of relay 3CR, front contact g of relay 1P, wire 56, back contact f of relay 8CR, front contact b of relay CKP, reverse contact a of relay NR, and back contact e of relay RP to terminal N. This circuit effectively shunts current away from the winding of relay XTK so that this relay releases, opening its front contact a to interrupt the stick circuit and its front contact b to extinguish lamp XTEK. Similar circuits are used to cause the release of all such indication relays at the office on the proper code step.

As can be seen from the previous description, one field unit will normally indicate both the positive and negative characters on a given code step. Each field unit further has the capacity for transmitting eight such indications in four pairs occupying if required the entire four code steps of a particular group. It is occasionally desirable to transmit the positive indication from one field unit and the negative indication from a different field unit during the same code step. With the system of my invention, it is possible to do this and is referred to herein as splitting indications. To the left of Fig. 2A, a note appended to the drawings indicates that alternate connections may be made from terminal 33 to terminal 34, 35, or 36 rather than to terminal B of the local source. These alternate connections are used when it is necessary to split indications. Normal operation has terminal 33 connected to terminal B, as shown by the solid line, with all indications being transmitted by this field unit. That is, at least the positive and negative indications for any one code step would be transmitted by the field unit with this regular connection. If split indications are necessary, certain selected jumpers are required between the various terminals F1 to F8, inclusive, which are normally paired for the positive and negative indications.

Referring now to Fig. 4, there is shown by conventional dot-dash blocks four station units, numbers 1 to 4, inclusive, which for convenience will be considered as assigned to group A of the field stations. Each of the conventional blocks is provided with external terminals corresponding to those shown in Fig. 2A, that is, terminals L1 and L2, the line connections; terminals 33 to 36, inclusive, the alternate connections for split indications to provide indication energy to the line; and terminals F1 to F8 and terminal NA, to which external connections are made over contacts of the wayside relays. The circuit arrangement inside each conventional dot-dash block is the same as shown in Fig. 2A for the code unit at a field station. Since these stations are assumed to form group A, the selective pattern of the connections between terminals 37 to 42, including rectifier unit RE3, are likewise the same as shown in Fig. 2A and these stations transmit their indications during the first four steps of the code.

Two field units, wired the same except for the jumpers discussed below, are necessary when splitting any code step. By splitting code step 1, field unit 1, with terminal 33 connected to terminal B, transmits the positive indication pulse. Field unit 2, with jumpers from terminal 33 to 34 and from F1 to F2, transmits the negative indication pulse on code step 1, and as many other indication pulses on the remaining code steps 2, 3, and 4 as desired. Code steps 2, 3, and 4 may also be split by installing the jumper connections at other stations from 33 to 35 or 36 and between F3 and F4, F5 and F6, and F7 and F8, respectively. In Fig. 4, the jumpers are so connected that station 1 transmits a positive indication pulse on code step 1 with the corresponding negative indication pulse being transmitted by station 2. The positive indication pulse for code step 2 is transmitted by station 2, with station 3 transmitting the corresponding negative indication pulse, both pulses on code step 3, and the positive pulse on code step 4. The final indication pulse in the first group of steps is transmitted as a negative indication pulse on code step 4 by station 4.

Referring again to Fig. 4, I shall assume that, at stations 1 and 2, relays ZTR and YTR are both released, so that active indications are to be transmitted at this time. During code step 1, back contact a of relay ZTR being closed completes a circuit over terminal F1 for charging capacitor CN of the station unit, and in turn for energizing relay NT when the capacitor discharges, causing this relay to pick up. The positive indication pulse in then transmitted from station 1 in the manner previously described. With relay NT picked up, closing its front contacts c and d, positive energy is applied to line wire L1 and negative to line wire L2 at the proper time to transmit this indication to the office. Relay RT at station 1 does not operate since there is no connection to terminal F2 to charge capacitor CR to provide energy for relay RT. At station 2, back contact a of relay YTR being closed completes a circuit for charging capacitor CR. At the same time, the jumper between terminals F1 and F2 completes a circuit, again over back contact a of relay YTR, for charging capacitor CN during the first code step. Thus, when relay F1R at this station releases, relays NT and RT are both energized and pick up. However, no positive indication pulse is transmitted from station 2 because the connection to terminal B at front contact c of relay NT is open, this connection being carried from terminal 33 over an external connection to terminal 34 and thence to terminal B over back contact a of relay F2P, this latter contact being open at this time since relay F2P at this station remains energized and picked up until the second code step.

When the charge on capacitor CN at station 2 dissipates and relay NT releases, the negative indication pulse is then transmited since relay RT is picked up, and reverse polarity energy is applied to the line circuit over front contacts c and d of relay RT in a manner previously described. At the office, relays NR and RR are operated as previously described upon the receipt of the positive and negative indication pulses from stations 1 and 2, respectively, and operate to complete circuits which will energize indication relays ZTK and YTK, respectively, which would be connected in this instance to terminals 1 and 2.

It is to be understood that the jumper at station 2 between terminals F1 and F2 is very important. Likewise, similar jumpers are required between terminal pairs F3—F4, F5—F6, or F7—F8 at stations which are transmitting only the negative indication pulse of the corresponding code step. If this jumper at station 2 is omitted, the positive and negative indication pulses on code step 1 will be transmitted at the same time from these two stations and will cancel out. This results naturally, with relay NT picking up in station 1, if only relay RT picks up at station 2 at the same time. To eliminate this condition, the jumper is added so that relays NT at both stations pick up simultaneously, locking out relay RT in field station 2 since relay NT at any station has preference over relay RT. Thus relay NT at station 1 transmits its positive indication pulse and then drops out. Relay NT at station 2, which is ineffective to transmit an indication drops out at about the same time and relay RT at this station is then permitted to take control and transmit the negative indication pulse.

In the group of stations of Fig. 4, code step 2 is split between stations 2 and 3. At station 2, the indication from a power-off relay 2POR is transmitted during the positive pulse and the indication from wayside relay WTR at station 3 during the negative pulse of step 2. If relay 2POR is released so that its back contact *a* is closed, the circuit is established at station 2 over terminal F3 when relay F2R picks up to charge capacitor CN, which is then followed, upon release of the line relay, by the energization of relay NT which picks up. At station 3, with relay WTR released, a circuit is completed over its back contact *a* and terminal F4 when relay F2R at that station picks up to charge capacitor CR. The jumper connection between terminals F4 and F3 completes the circuit for also charging capacitor CN so that at station 3 relays NT and RT will both be energized at the proper time and pick up. Thus the positive indication pulse on code step 2 is transmitted from station 2 over front contacts *c* and *d* of relay NT. The connection to positive terminal B of the local source is completed over back contact *a* of relay F2P, terminal 34, and the connection to terminal 33. At station 3, with an external connection from terminal 33 to terminal 35, the corresponding connection from front contact *c* of relay NT to terminal B is interrupted at back contact *a* of relay F3P, this relay being picked up at this time so that its back contact is open. When relays NT release at stations 2 and 3, relay RT at station 3 takes control and transmits its negative indication pulse in the manner previously described, and the positive and negative indication pulses on code step 2 are thus received in the proper manner at the office and recorded on relays corresponding to the indications, here designated 2POK and WTK, respectively.

The positive indication pulses on code steps 3 and 4 may be transmitted from station 3 since back contact *a* of relay F3P will be closed at this time, completing the connection from terminal B over this contact, terminal 35, and the jumper to terminal 33, and thence over front contact *c* of relay NT to line wire L1. As indicated in Fig. 4, both indication pulses of code step 3 will be transmitted from station 3, the circuits being shown conventionally by dotted lines as they would be identical with those previously described, for example, in connection with Fig. 2A. Code step 4 of this group is split between stations 3 and 4 with station 3 transmitting the positive indication pulse as controlled by back contact *a* of power-off relay 3POR, with the connection being made to terminal F7 to charge capacitor CN. At station 4, a circuit for charging capacitor CR is completed over back contact *a* of wayside relay 4POR and terminal F8. A jumper connection from terminal F8 to terminal F7 provides a circuit for also charging capacitor CN so that both relays NT and RT are picked up if an active indication is to be transmitted from relay 4POR. However, since there is no connection to terminal 33 at station 4, no energy is supplied over front contact *c* of relay NT to line wire L1 for transmitting the positive indication pulse, so that no interference occurs with the positive indication pulse which may or may not be transmitted from station 3 on this code step. The negative indication pulse from station 4 will be transmitted in the usual manner. Although not shown, it is apparent that if code step 3 is to be split between two stations, the connection from terminal 33 at the station transmitting the negative portion of the indications will be to terminal 36 so that during code step 3 this circuit would be open at back contact *a* of relay F4P.

If no splitting of indications is required in a particular group of stations, the special connections just discussed need not be made. For example, if station 2 of a group is to transmit all of code step 2 only, relays NT and RT at this station can not be energized on code step 1 since there will be no external connections to terminals F1 and F2 to charge the corresponding capacitors. Therefore, terminal 33 may be connected directly to positive terminal B of the local source so that the positive indication pulse on code step 2 may be transmitted when required. Correspondingly, if station 3 of the group is to transmit all of the indication pulses on steps 3 and 4, no interference is possible with stations transmitting on code steps 1 and 2 since there will be no external connections at such a station 3 to terminals F1, F2, F3, and F4. Therefore, at this station, the connection from terminal 33 will be direct to terminal B of the local source.

The system of my invention, as described herein and as shown in the accompanying drawings, thus provides a remote indication system having several advantages. The system provides continuous operation so that the transmission of indications from all of the stations is accomplished at the earliest possible moment, each station being scanned during each cycle of the continuous code. Code progression is controlled by the central office equipment which allows a reduction of the amount of apparatus provided at the various remote stations. Indications may be recorded not only at this central office location but also at other secondary indication recording points which are provided with apparatus similar to the office except for the elimination of the code transmitting relays. In this system, the number of operations of the various relays is reduced in order to assure a relatively long life. At each station unit, the line or counting chain relays and the line stick repeater relays operate only once during each code cycle. At the office and other registry units, the corresponding line or counting chain relays and the line stick repeater relays operate during each group of four code steps, as shown here, so that in the specific sixteen step code described, these relays operate four times per code cycle. Other relays at the office, notably the chain repeat relays including the pole changing relay, operate only once during each code cycle similar to the line and line stick repeater relays at the station units. The code checking and code check repeater relays at the office, once they are energized and have picked up, remain held up continuously during continuous coding so that their operation occurs only when it is necessary to restart the coding action. The code transmitter and transmitter relay at the office and the line repeater relay, which must operate on each code step, are external to the unit so that they may be designed to withstand the continuous operation. Such relays are already well known in the art and provide a long life of continuous operation. The system is relatively economical in its use of power since each code step consists of only a partial period of energization of the line circuit, and the indication pulses from the stations are at a reduced level of energization. Although herein shown as utilizing a two-wire line circuit, it is possible to utilize other types of communication channels between the office and field stations, so that use may be made of existing channels without the necessity of providing a separate line circuit. The progression of the code is continuously checked at the office by the chain repeat and other relays so that the occurrence of faults or spurious pulses may be detected and the necessary corrective action taken.

Although I have herein shown and described but one form of apparatus providing a remote indication system embodying my invention, it is to be understood that various changes and modifications may be made therein within the scope of the appended claims without departing from the spirit and scope of my invention.

Having thus described my invention, what I claim is:

1. A remote indication system including an office recording location and at least one indication transmitting location connected by a communication channel, said office location including a master coding means and a registry unit, said coding means including contacts which continuously open and close in a periodic code pattern, said contacts being effective when closed to supply energy to said channel, said registry unit including a chain of line relays and a receiving relay means, said chain relays having connections to said channel so as to be sequentially responsive to successive periods of energization of said channel by said coding means, the sequential operation of said chain relays being effective to continuously drive said registry unit in a repeating code cycle and to connect said receiving relay means to said channel during each deenergized period, said indication location including a code following apparatus and indication transmitting means, said code following apparatus including another chain of line relays sequentially responsive at times to the code operation of said office coding contacts, said other chain relays being effective at said times to drive said code following apparatus in step with said office registry unit, said indication transmitting means being responsive to the operation of said code following apparatus to transmit indications over said channel during its deenergized periods while said code following apparatus is operating, said office receiving relay means being responsive to said indications and effective in conjunction with the operation of said registry unit to properly record the received indications at said office.

2. A remote indication system including an office recording location and at least one indication transmitting location connected by a communication channel, said office location including a master coding means and a registry unit, said coding means including contacts which continuously open and close in a periodic code pattern, said contacts being effective when closed to supply energy to said channel, said registry unit including a relay counting chain and a receiving relay means, said chain relays having connections to said channel so as to be sequentially responsive to successive periods of energization of said channel by said coding means, the sequential operation of said chain relays being effective to continuously drive said registry unit in a repeating code cycle and to connect said receiving relay means to said channel during each deenergized period, said indication transmitting location including code following apparatus and indication transmitting means, said code following apparatus including another relay counting chain sequentially responsive at times to the code pattern transmitted by said office coding means, said other relay chain being effective at said times to drive said code following apparatus in step with said office registry unit, said indication transmitting means being responsive to the operation of said code following apparatus to transmit indications over said channel during its deenergized periods while said coding apparatus is operating, said office receiving relays being responsive to said indications, said office receiving means and said office relay counting chain together being effective to record each indication according to the type of indication and the position to which the counting chain has advanced.

3. In a remote indication system, including a control office and at least one station location connected by a line circuit, said office controlling said system by transmitting a continuous code over said line circuit, said station at times during said continuous code transmitting active indications over said line circuit, a registry unit comprising a chain of line relays, a chain of line stick repeater relays one for each line relay, a series of chain repeat relays, and an indication receiving relay means; said line relays having connections to said line circuit and responsive to said continuous code to operate in sequence through said chain, said line stick repeater relays operating to repeat the operation of the corresponding line relay providing the preceding line repeater relay has released, said chain repeat relays being energized and then deenergized individually in sequence at selected times in the operation of said line relays, said chain repeat relays being effective to actuate repeat cycles of operation of said line relay chain, said receiving relay means having connections to said line circuit and effective to receive active indications transmitted by said station; said receiving relay means, said line stick repeater relays, and said chain repeat relays together being effective to record each indication in accordance with the operated position to which said line relay chain has advanced.

4. In a remote indication system including a control office and a plurality of spaced stations connected by a line circuit, each station including a code following unit adapted to at times transmit assigned active indications to said office, the combination at the office comprising, a code transmitting relay means, a line repeater relay, and a registry unit; said transmitting relay means being effective to continuously transmit over said line circuit a stepped code which is divided into repeated cycles of a preselected number of code steps, each code step comprising an energized and a deenergized period of said line circuit, said code being effective to drive the code following unit at each station to transmit in its turn the indications assigned to the corresponding station, said registry unit including a chain of line relays, a chain of line stick repeater relays one for each line relay, a series of chain repeat relays and an indication receiving means; said line relays having connections to said line circuit and being responsive to the coded energy to repeatedly operate in sequence through said chain, said line repeater relay repeating the operation of each line relay, said line stick repeater relays operating to repeat each operation of the corresponding line relay if the preceding stick repeater relay has released, said chain repeat relays being energized and deenergized individually on selected code steps in each cycle in response to the joint operation of the two relay chains, said chain repeat relays being effective to actuate repeat cycles of operation of said line relay chain, said indication receiving means having connections to said line circuit during the deenergized period of each code step and effective to receive the active indications transmitted from each station; said receiving means, said stick repeater relay chain, and said chain repeat relays being effective to record the received indication in accordance with the station from which transmitted.

5. In combination, in a remote indication system comprising an office location and at least one station connected by a line circuit, a master coding means at said office having connections to said line circuit and effective to continuously transmit a stepped code having a cycle of preselected length, each code step comprising an energized and a deenergized period and having assigned thereto a pair of indications, a chain of line relays at said station having connections to said line circuit and responsive at times to said coded energy to operate in sequence on successive code steps, operation of said chain being initiated by the energization of the first line relay, said first line relay being selectively connected to said line circuit to be energized only on preselected code steps, a line stick repeater relay for each line relay, said repeater relays being energized in sequence during the initial cycle of operation and each second cycle of operation thereafter of said line relay chain, each said repeater relay being subsequently held energized over a deenergized contact of the corresponding line relay and deenergized during the succeeding cycle of operation of said line relay chain, a first and a second indication transmitter relay at said station, each transmitter relay being responsive to the operation of said line relay chain during the deenergization cycle of said repeater relays and becoming energized during a code step if the associated indication is in an active condition, said first and said second transmitter relay being effective when energized to transmit an indication pulse having a first characteristic and a second characteristic respectively to said office during the deenergized period of the corresponding code step, and receiving means at said office having connections to said line circuit and selectively responsive to said indication pulses of either characteristic to receive and record the transmitted indications.

6. In combination, in a remote indication system comprising an office location and a plurality of stations connected by a line circuit, a master coding means at said office having connections to said line circuit and effective to continuously transmit a stepped code having a cycle of preselected length, each code step comprising an energized and a deenergized period having assigned thereto a pair of indications, said energized periods having at times a first characteristic and at other times a second characteristic, a chain of line relays at each station having connections to said line circuit and responsive at times to said coded energy to operate in sequence on successive code steps, operation of said chain being initiated by the energization of the first line relay, said first line relay being selectively connected to said line circuit to be energized only on preselected code steps, a line stick repeater relay for each line relay, said repeater relays being energized in sequence during the initial cycle of operation and each second cycle of operation thereafter of said line relay chain, each said repeater relay being subsequently held energized over a deenergized contact of the corresponding line relay and deenergized during the succeeding cycle of operation of said line relay chain, a first and a second indication transmitter relay at each station, each transmitter relay being responsive to the operation of said line relay chain at that station during the deenergization cycle of said repeater relays and becoming energized during a code step if the associated indication is in an active condition; said first and said second transmitter relay being effective when energized to transmit an indication pulse having said first characteristic and said second characteristic respectively to said office during the deenergized period of the corresponding code step, each indication pulse being of a reduced energy level lower than the energy level of said energized period of each code step, said station line relays being non-responsive to line energy of said reduced level; and receiving means at said office having connections to said line circuit and responsive to said indication pulses of either characteristic to receive and record the transmitted indication.

7. In a remote indication system including a control office and at least one station connected by a line circuit, said office including master coding apparatus and an indication receiving means, said coding apparatus being effective to transmit a continuous code over said line circuit comprising alternate energized and deenergized periods, a code following unit at said station comprising a chain of line relays, a line stick repeater relay for each line relay, and an indication transmitting means; said line relays having connections to said line circuit and responsive to said continuous code to operate in sequence through said chain, the first line relay being selectively connected to said line so as to operate to initiate chain operation only at preselected times during said code, said line stick repeater relays being energized in sequence by the operation of the associated line relays during the initial cycle of operation of said line relay chain, and each second cycle of operation thereafter, each said repeater relay subsequently being held energized over a non-operated position contact of said associated line relay and deenergized during the succeeding cycle of operation of said line relay chain, said indication transmitting means being responsive to the cycle of operation of said line relay chain during the cycle of deenergization of said repeater relays to transmit separate active indications over said line circuit during each deenergized period of said code, said office indication receiving means being adapted to receive such indications and effective to record the active or inactive condition of each indication.

8. In a remote indication system including a control office and at least one station connected by a line circuit, said office including master coding apparatus and an indication receiving means, said coding apparatus being effective to transmit a continuous code over said line circuit of alternate energized and deenergized periods, said energized periods being at times of one characteristic and at other times of another characteristic, said receiving means being effective to receive and record indications from said station; a code following unit at said station comprising a chain of line relays, a line stick repeater relay for each line relay, and an indication transmitting means; said line relays having connections to said line circuit and responsive to said continuous code to operate in sequence through said chain, the first relay of said chain being selectively operated in accordance with the characteristic of the line energy and the position to which said code is advanced, the first repeater relay being energized in response to the energization of said first line relay only if the last repeater relay is deenergized, each other repeater relay being energized in response to the energization of the corresponding line relay only if the preceding repeater relay is energized, each repeater relay subsequently being held energized over a deenergized position contact of the corresponding line relay, whereby said repeater relays are energized and deenergized respectively by alternate cycles of operation of said line relay chain, said indication transmitting means being responsive to the cyclic operation of said line relays during the cycle of deenergization of said repeater relays to transmit separate active indications over said line circuit during each deenergized period of said code.

9. In a remote indication system including an office and at least one station connected by a line circuit, said office including a master coding means and an indication receiving means, said coding means being effective to transmit in repeating cycles a continuous code comprising alternate periods of an energized and a deenergized condition of said line circuit, said line circuit being energized at times with a first characteristic and at other times with a second characteristic, a code unit at said station comprising a chain of line relays, a line stick repeater relay for each line relay, and a normal and a reverse transmitting relay; said line relays having connection to said line circuit and being responsive at times to said continuous code to operate in sequence through said chain, the first line relay being selectively connected to be responsive to the line energy only at preselected positions in the code cycle, the first repeater relay being energized in response to the energization of said first line relay only if the last repeater relay is deenergized, each other repeater relay being energized in response to the energization of the corresponding line relay only if the preceding repeater relay is energized, each repeater relay subsequently being held energized over a deenergized position contact of the corresponding line relay, said repeater relays thus being energized and deenergized by alternate cycles of operation of said line relay chain, said transmitting relays being energized during the deenergized periods of said code in accordance with the active indications to be transmitted as selected by said line relays and said repeater relays during the deenergization cycle of said repeater relays, said transmitting relays being effective when energized to transmit in sequence a pulse of energy of said first characteristic and a pulse of energy of said second characteristic over said line circuit during said deenergized periods, said indication receiving means being responsive to the indication pulses to receive and record such indications.

10. In a remote indication system including an office and at least one station connected by a line circuit, said office including a master coding means and an indication receiving means, said coding means being effective to transmit continuously in repeating cycles a stepped code of a selected length, each code step comprising an energized and a deenergized period of said line circuit, said energized period being at times of one relative polarity and at other times of the opposite polarity, a code unit at said station comprising a chain of line relays, a line stick repeater relay for each line relay, and a first and a second transmitting relay; said line relays having connection to said line circuit and responsive at times to the coded energy from said office to operate in sequence through said chain, the first line relay being selectively connected to be responsive to the line energy to initiate chain operation only at preselected times in each code cycle, the first repeater relay being energized in response to the energization of said first line relay only if the last repeater relay is deenergized, each other repeater relay becoming energized in response to the energization of the corresponding line relay only if the preceding repeater relay is energized, each repeater relay subsequently being held energized over a deenergized position contact of the corresponding line relay, said repeater relays thus being energized and deenergized by alternate cycles of operation of said line relay chain, said line relays and said repeater relays together being effective during the release cycle of said repeater relays to energize said transmitting relays during each code step that the associated indication is active, said first and said second transmitting relay having connections to said line circuit and being effective when energized to transmit in sequence an indication pulse of said one polarity and of said opposite polarity respectively during the deenergized period of the corresponding code step, said station line relays being non-responsive to said indication pulses, said office receiving means being responsive to said indication pulses to receive and record the associated active indications.

11. In a remote indication system including a control location and a plurality of stations connected by a line circuit, said office including a code transmitting means having connection to said line circuit to continuously transmit a stepped code having a cycle of predetermined length, each code step comprising an energized and a deenergized period, each station including a code following unit responsive to said stepped code to transmit indication pulses at selected times over said line circuit during the deenergized periods of the code steps, each code step having a normal and a reverse indication assigned thereto; an indication registry location comprising a chain of line relays, a chain of stick repeater relays one for each line relay, a line repeater relay, a series of chain repeat relays, and a normal and a reverse indication receiving relay; an energizing circuit for each line relay including a back contact of the preceding line relay in the chain and a front contact of the stick repeater relay corresponding to said preceding line relay, the energizing circuits having connection to said line circuit and responsive to said stepped code to energize said line relays in sequence one during each code step, the chain sequence being continuously repeated during each code cycle, an energizing circuit for each stick repeater relay including a front contact of the corresponding line relay and a back contact of the preceding stick repeater relay, a stick circuit for each stick repeater relay including a back contact of the succeeding line relay, said line relay and stick repeater relay chains being effective to follow said stepped code to provide a count of the code steps, an energizing circuit for said line repeater relay including in multiple a front contact of each line relay, an energizing circuit for each chain repeat relay effective to energize the relay during a selected code step, the circuit including a contact closed during the selected code step by the operation of said relay chains and contact of the next preceding chain repeat relay closed when said preceding chain repeat relay has properly operated in the continuous code action, contacts of said chain repeat relays being interposed in the energizing circuits of selected line relays to check the progression of the operation cycle of the relay chains; an energizing circuit for each of the receiving relays having connection to said line circuit and including a front contact of said line repeater relay, a back contact of each line relay, and a half-wave rectifier unit poled to select only the corresponding indication pulse for said normal and said reverse receiving relays respectively; and an indication recording circuit arrangement including contacts of said stick repeater relays, said chain repeat relays, and said receiving relays effective to record the indication pulses received or the lack of such pulses according to the code step to which the indication is assigned.

References Cited in the file of this patent

UNITED STATES PATENTS

| | | |
|---|---|---|
| 2,045,713 | Judge | June 30, 1936 |
| 2,098,910 | Blake | Nov. 9, 1937 |
| 2,788,515 | Breese | Apr. 9, 1957 |